US006213780B1

(12) United States Patent
Ho et al.

(10) Patent No.: US 6,213,780 B1
(45) Date of Patent: Apr. 10, 2001

(54) COMPUTER-AIDED LEARNING AND COUNSELING METHODS AND APPARATUS FOR A JOB

(76) Inventors: Chi Fai Ho, 965 Astoria Dr., Sunnyvale, CA (US) 94087; Peter P. Tong, 1807 Limetree La., Mountain View, CA (US) 94040

( * ) Notice: Subject to any disclaimer, the term of this patent is extended or adjusted under 35 U.S.C. 154(b) by 0 days.

(21) Appl. No.: 09/273,392

(22) Filed: Mar. 22, 1999

Related U.S. Application Data

(63) Continuation-in-part of application No. 09/110,569, filed on Jul. 6, 1998, now Pat. No. 6,126,448.
(51) Int. Cl.[7] .................................................. G09B 19/00
(52) U.S. Cl. ........................ 434/219; 434/118; 434/350; 706/927; 707/104; 708/131
(58) Field of Search ..................................... 434/118, 219, 434/323, 335, 350, 362, 365; 707/1, 3, 10, 100, 104, 512; 705/1, 8; 706/927; 708/131, 160; 345/967; 382/116, 309; 340/825.34

(56) References Cited

U.S. PATENT DOCUMENTS

| | | |
|---|---|---|
| 4,611,996 | 9/1986 | Stoner . |
| 5,029,081 * | 7/1991 | Kagawa ............................. 708/131 |
| 5,035,625 | 7/1991 | Munson et al. . |
| 5,164,897 * | 11/1992 | Clark et al. ............................... 705/1 |
| 5,224,173 * | 6/1993 | Kuhns et al. ........................ 382/116 |
| 5,251,294 * | 10/1993 | Abelow ................................ 707/512 |
| 5,259,766 | 11/1993 | Sack et al. . |
| 5,306,154 | 4/1994 | Ujita et al. . |
| 5,316,485 | 5/1994 | Hirose . |
| 5,326,270 * | 7/1994 | Ostby et al. ........................... 434/362 |
| 5,416,694 * | 5/1995 | Parrish et al. .............................. 705/8 |
| 5,597,312 | 1/1997 | Bloom et al. . |
| 5,727,950 * | 3/1998 | Cook et al. ............................ 434/350 |
| 5,727,951 | 3/1998 | Ho et al. . |
| 5,743,746 | 4/1998 | Ho et al. . |
| 5,788,504 * | 8/1998 | Rice et al. ............................. 434/219 |
| 5,794,178 | 8/1998 | Caid et al. . |
| 5,832,497 * | 11/1998 | Taylor ................................... 707/104 |
| 5,867,799 * | 2/1999 | Lang et al. ................................ 707/1 |
| 5,884,270 | 3/1999 | Walker et al. . |
| 6,126,448 * | 10/2000 | Ho et al. ............................... 434/219 |

OTHER PUBLICATIONS

Success Maker Courseware brochure, published by Computer Curriculum Corporation Dec. 1994.
Active Mind Series from World Wide Web, URL = http://www.broderbund.com/studio/ams.html 1996.
Logical Journal of the Zoombinis from World Wide Web, URL = http://www.broderbund.com/studio/atoz/zoombini.html 1996.
Selecting Software by PC Novice Series, vol.3, Issue 12, pp. 51, 64, and 89–92 1995.
Computerized Adaptive Testing, Oct. 24, 1994, from World Wide Web, URL = Gopher://Gopher.ETS.org.
Innovation and Technologies, Oct. 21, 1994, from World Wide Web, URL = Gopher://Gopher.ETS.org.
Interactive Mathematic Instructor's Guide by Academic Systems, pp. 86 and 114 Aug. 1995.

(List continued on next page.)

Primary Examiner—Joe H. Cheng
(74) Attorney, Agent, or Firm—Peter Tong

(57) ABSTRACT

Computer-aided learning methods and apparatus that can automatically identify learning objectives and provide learning materials for a user based on a job position identified for the user. The identification process depends on at least one attribute of the user's profile. After the job position is identified, the apparatus ascertains at least one learning objective for selecting learning materials to prepare the user for the job position. The user may be in the process of leaving a company, or may be graduating from a school.

47 Claims, 23 Drawing Sheets

OTHER PUBLICATIONS

High School Learning and Resource Library by ProOne, photocopy of the box and screen–dump to get 5 pages 1995.
Asymetrix Librarian from www.asymetrix.com/products/librarian 1998.
PeopleSoft Human Resources Management Solution 1998.
CareerMosaic URL = http://www.careermosaic.com 1998.
Career.com www.career.com 3 pages 1994–1999.
CareerPath.com www.careerpath.com 2 pages 1997–1999.
America's Learning Exchange www.alx.org 7 pages 1998.
Telecommunications Industry by Nova pp. 31–36, 1996.

* cited by examiner

COMPUTER-AIDED LEARNING AND COUNSELING METHODS AND APPARATUS FOR A JOB

CROSS-REFERENCE TO RELATED APPLICATIONS

This is a continuation-in-part of U.S. Pat. application Ser. No. 09/110,569, filed on Jul. 6, 1998, now U.S. Pat. No. 6,126,448, which is incorporated by reference into this application.

BACKGROUND OF THE INVENTION

This invention relates generally to computer-aided learning methods and apparatus, and more particularly to computer-aided learning and counseling methods and apparatus for a job.

We are living in the midst of tremendous technological changes. In the workplace, technology is replacing numerous workers. Many of our job skills are being obsoleted. Though technology is permeating gradually into every stratum of the society, it is very hard to keep up with so much changes.

Not only is it hard to keep up, technology has made the world much smaller, and global competition much more intense. It is not uncommon for a product to have its software written in India, semiconductor chips manufactured in Malaysia, overall physical design done in Italy, and its promotion extensively performed in the United States. The product uses expertise from so many different places because someone in the other side of the world can do a better job at a lower cost.

Not just facing global competition, we are also challenged by the younger generation. Many of them have access to computers and the Web at a very young age. Before graduation from high school, they might have already spent years playing with the Web. Their knowledge in computer might be much more up-to-date and hands-on than ours. They might be much more effective and efficient than us in performing computer-oriented jobs.

Drastic and rapid changes in the economy lead to massive re-deployment of the labor force. Due to technology revolutions in the industrial nations, and social upheaval in many third-world countries, every year, thousands of job titles with their job functions are being eliminated. Numerous industries experience massive layoffs, which are usually more geared towards the older and higher-paid employees. This problem is exacerbated by the aging of the population when employers tend to retain the younger work force, with more current education. Many employees are in transition. They need jobs. Such global challenges are not limited to the private industries. Millions of civil service employees and military personnel have to be re-trained.

Our career is at risk. We need to keep on learning to stay competitive. However, many of us are already working full time. It is difficult to find time to learn. Computer-based learning may be able to alleviate part of the problem by allowing learning materials to be conveniently accessible, such as through the Web, or on compact disks. Learning from such materials are typically cheaper than learning from a live instructor in a classroom. Computer-based learning approaches give us the freedom to decide the time and the place to learn. Thus, computer-based learning is an efficient learning medium.

On the other hand, saving tine and money to learn may not imply that we know what to learn. Though we may want to learn materials directly useful to our jobs, sometimes, it is not clear what those materials are, and where we can get hold of them.

The problem becomes more acute if we might be forced to leave the company, or we want to move to a different company. It is not clear as to what jobs are available that suit our needs. What needs to be learnt is not easy to define.

It should be apparent that there is a need to automatically provide appropriate counseling and learning materials in easily accessible manner for a user regarding her career.

SUMMARY OF THE INVENTION

The present invention provides computer-aided learning methods and apparatus for counseling and training a user for a job position. The easily-accessible materials guide the user to and prepare the user for the job position.

Every company, whether big or small, tries to satisfy certain customer needs. In order to satisfy those needs, companies have jobs that need to be done. For a small company, the jobs might be setting up an electronic mailing system, or its accounting system. Big companies have more elaborate job classification and descriptions.

A company may try to fill its job needs by creating different positions. For example, to find someone to set up an electronic mailing system, the company might try to hire an information technologist. For a small company, the technologist might also be responsible for many other tasks, such as to install a new intelligent phone system for the company.

If the company has an organization chart, each node in the chart can denote one position. Every position has its responsibility, which can be performing one or more jobs by anyone filling that position. Some companies retain such information in their human resource department. If an employee is at a certain position, and his job requirement changes, the company can reflect the change by changing the job description of that position.

To fill a position with a job description, the company hires a person with a certain background. Such background, with its experience, can be acquired through learning certain materials.

In one embodiment, a computer stores in its database the one or more positions of the company, with their job descriptions, and the learning materials to be acquired to fill each position. Such information can be updated as changes occur.

Based on, for example, the organization chart and the position of the user, the computer can identify the jobs she needs to do, and the learning materials she needs to acquire, or she should have acquired, to do those jobs. From the organization chart, the computer can also identify the positions of her colleagues and her superiors, the jobs they need to do, and the corresponding learning materials to be acquired to do those jobs.

In one embodiment, the computer asks the user if she wants to move into positions different from her position, such as her supervisor's position. If the answer is affirmative, the computer can deliver appropriate learning materials for her to learn.

In another embodiment, a user has her own business. Her position is a small business owner. Based on her position, the computer can identify the numerous tasks or jobs she needs to do, and the learning materials she needs to acquire to do those jobs. Based on these information, the computer again can ask her if she wants to acquire certain knowledge to do some of her tasks. If she wants to, the computer can deliver those learning materials to her.

In the above embodiments, the user is typically associated with a company. However, there are situations when the user is in the process of leaving, either voluntarily or involuntarily, a company; or the user may be about to graduate from a school. Under such situations, the computer can also perform job counseling functions. The computer identifies one or more job positions suitable for her, based on at least one attribute of her profile. Her attributes can include her learning history, and work experience, such as her current job functions. The identification process may also depend on her preference, the availability of jobs, and the availability of learning materials to prepare the user for the jobs. If she needs additional training for the potential job positions, the computer also ascertains for her at least one learning objective to prepare her for the job positions. Based on the objective, the amount of timing required can also be ascertained, and the training materials can also be selected.

The learning materials can be delivered through her computer. She can be in control as to when to learn. If the materials are delivered through a network, she can also have a certain degree of freedom to choose where to learn.

Thus the present invention can provide job counseling and training to prepare a person for a job position. The materials can be provided in an easily accessible manner.

In one embodiment, the present invention can also be used by companies to recruit potential employees for a job, and to ascertain the amount of learning required for the potential employees to do a job.

Other aspects and advantages of the present invention will become apparent from the following detailed description, which, when taken in conjunction with the accompanying drawings, illustrates by way of example the principles of the invention.

Same numerals in FIGS. 1–21 are assigned to similar elements in all the figures. Embodiments of the invention are discussed below with reference to FIGS. 1–21. However, those skilled in the art will readily appreciate that the detailed description given herein with respect to these figures is for explanatory purposes as the invention extends beyond these limited embodiments.

DETAILED DESCRIPTION OF THE INVENTION

The present invention can automatically provide learning materials regarding a job of a company to a user, who is associated with the company. The decision whether to provide learning materials to the user depends on a job position that is related to the user. Learning materials are presented to the user for a number of reasons, such as to help her do the one or more jobs involved in the job position, or just to help her learn about the job position.

In one embodiment, the user is associated with the company if she can access the company's private information, or information that is not available to the public. The user can be associated with the company under a number of conditions. For example, she can be the company's employee, contractor or consultant.

Figure 1:
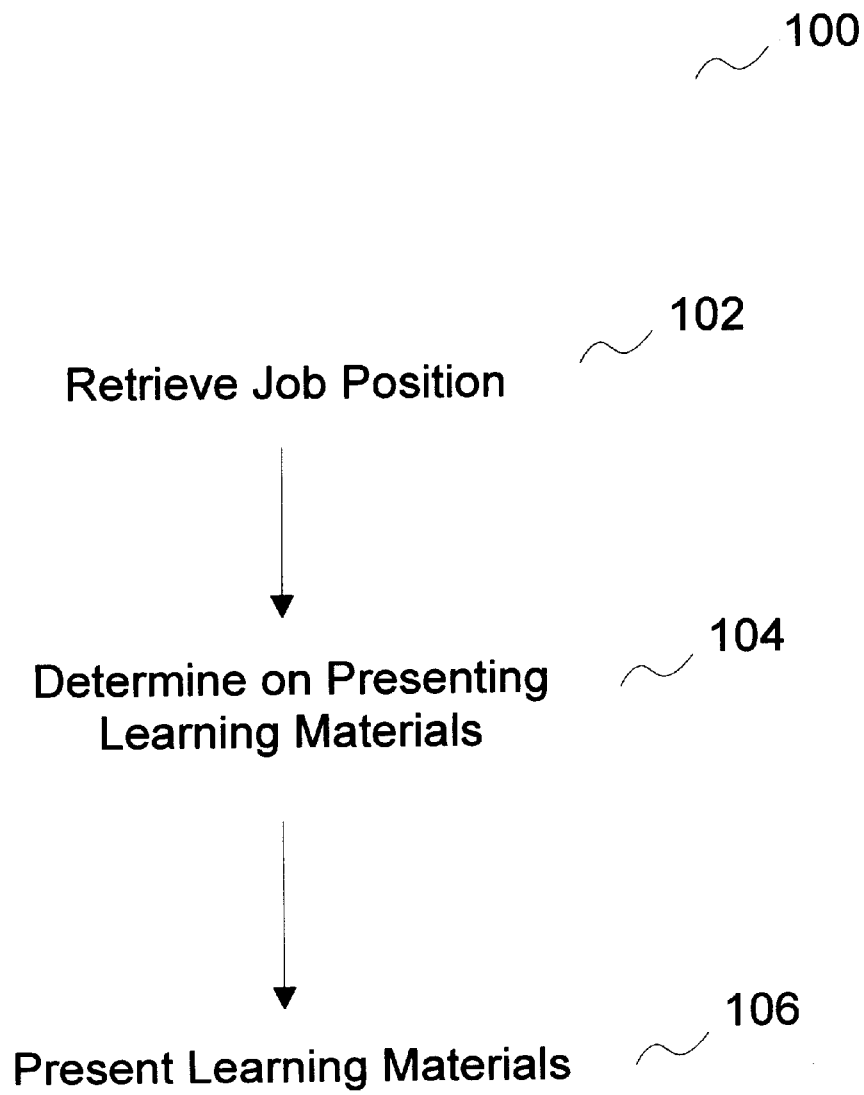
FIG. 1 shows a set of steps to implement one embodiment of the present invention.
Figure 2:
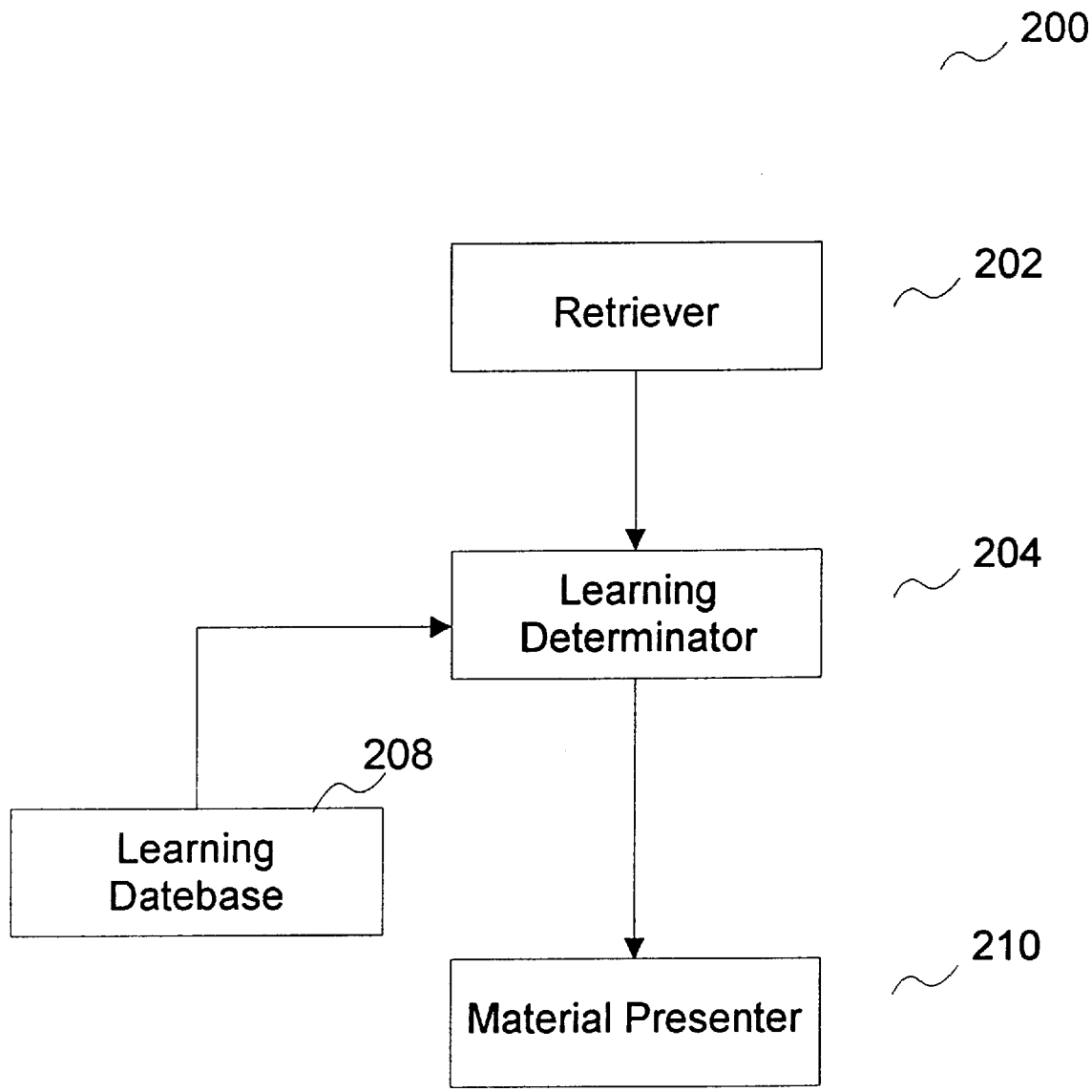
FIG. 2 shows an apparatus to implement one embodiment of the present invention.

There are a number of ways to implement the present invention. FIG. 1 shows one set of steps, 100; and FIG. 2 shows an apparatus, 200, to implement one such embodiment. First, a retriever, 202, retrieves (step 102) the job position, which, in one embodiment, is the job position occupied by the user. Then, based on one or more criteria, a learning determinator, 204, determines (step 104) whether learning materials should be presented to the user. In one embodiment, the retriever, 202, can identify her job position from her profile, which can also be stored in the apparatus.

In one embodiment, the learning determinator, 204, identifies the one or more jobs to be performed by a person occupying the retrieved job position; and the learning determinator, 204, may also ascertain the learning materials applicable to help her perform the one or more jobs. If learning materials should be presented to the user, a material presenter, 210, presents (step 106) the learning materials to her. Information such as the learning materials, and the jobs related to a job position, can be stored in a learning database, 208.

Figure 3:
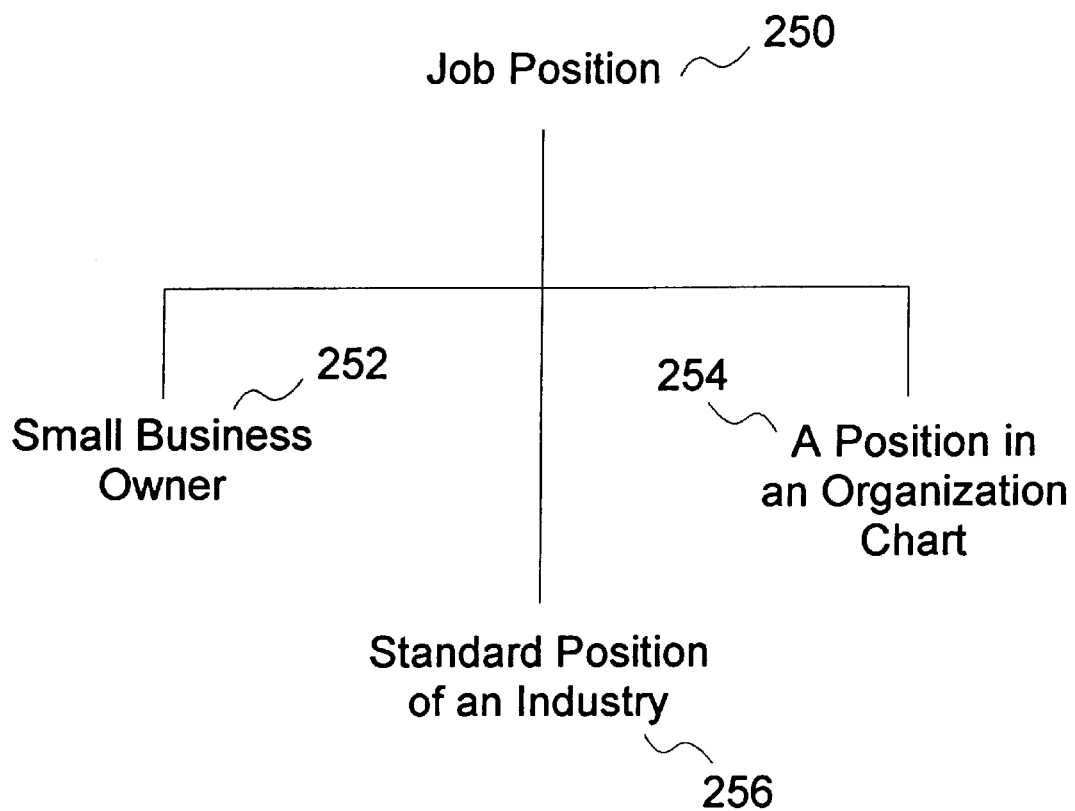
FIG. 3 shows examples of job positions applicable to the present invention.

FIG. 3 shows examples of job positions, 250, for the present invention. In one example, the user may be a small business owner, 252, without any or with very few employees. In one embodiment, the learning materials depend on the business the owner is in.

In another example, the user might hold a position, 254, in a company with many employees. That job position may be the position the company used to hire her, or later to evaluate her performance. Typically, the company includes an organization chart, which can be a chart showing her position relative to others. The chart is typically a hierarchical structure. It can start with the company's management team, including the major department heads, such as the chief technology officer. Then, under each department head, there is another chart showing the job positions of employees in her department. The job positions can include different grade levels, such as senior member of the technical staffs, and junior member of the technical staffs. In one embodiment, a position in the chart also includes data describing the one or more jobs a person in that position has to do. The title of the one or more jobs can be tied to their corresponding job position. Information in the chart can be stored in the leaning database.

In yet another embodiment, the job position is from standard positions, 256, of an industry. For example, the industry is the banking industry, and the job position is a bank teller. The user may want to learn about a job position of a company, or she may want to occupy that position. In this situation, the job position is related to the user in the sense that she is interested in that job position.

In another embodiment, each job position only has one job to perform. In this case, the title of the position can be the title of the job.

People in different job positions typically have to perform different jobs. Based on a job position, the corresponding one or more jobs that are required to be done can be defined. For example, a small business owner might have to set up an intelligent mailing system, a Window NT environment on one of her computers, and an accounting system. She might have to connect a number of her computers and computer peripheral devices to a router. There can be many jobs she needs to do. Some of them can be quite complicated, and some of them might be related to each other. She might have to do some of them a number of times, such as preparing yearly income tax return for her company. However, some of them she might only have to do once, such as setting up her intelligent mailing system. All of the jobs can be linked or partially linked together, into linked job titles. The linked job titles can indicate through a hierarchical structure which job should be performed before some of the other jobs. This can be for efficiency reasons. The linked job titles of a small business can be defined, for example, by those skilled in the art of that business, and will not be further described in this disclosure.

Similarly, an employee in an organization with a specific job position also has one or more jobs to perform. For example, if she is a circuit designer, she might have to know how to use a computer-aided design tool, the methodology of circuit design, the ways to test a designed circuit to see if it functions properly under normal and stressed conditions, and techniques to present her results to her colleagues.

Figure 4:
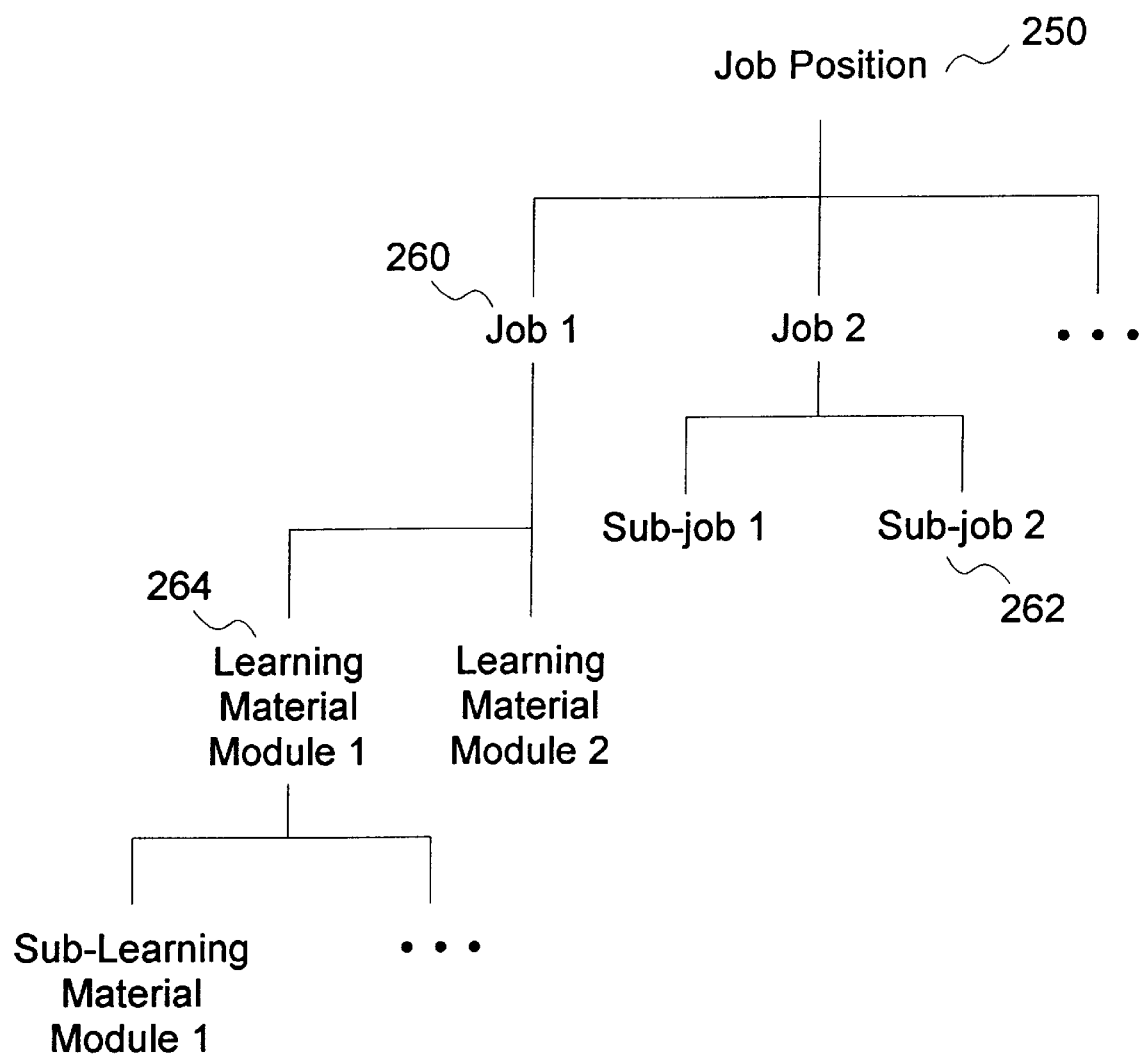
FIG. 4 shows one embodiment of relationships among the job position with different jobs to be done and the appropriate learning materials applicable for the jobs.

The one or more jobs to be performed for a job position can be classified. FIG. 4 shows one embodiment of hierarchical relationships among the job position, 250, and the one or more jobs, such as 260, to be performed. A job can be further classified into sub-jobs, such as 262. In one embodiment, such relationship information can be stored in the learning database, 208.

To accomplish different tasks one needs certain skills and knowledge. These skills and knowledge can be learnt. In one embodiment, the learning database also includes information of learning materials one should have acquired to accomplish a certain job.

FIG. 4 shows one embodiment of relationships among the appropriate learning materials for a job. In one embodiment, the learning materials are modularized, with each learning module, such as 264, being an object. Some of the learning materials are further classified into sub-learning material modules. These learning material modules may be stored in the learning database. In another embodiment, the apparatus can access through a network the learning materials when they are needed.

The learning material modules may be in different formats and approaches. For example, the materials can be a multimedia presentation, interactive presentations with questions and answers, or can have exercises. In one embodiment, a learning material module includes a scenario on solving a problem in a job. By following the scenario, the user can learn how the problem should be resolved.

Through the user's job position, the determinator, 204, can access the learning database to identify the one or more jobs required to be performed by the user. The determinator, 204, can also identify positions related to the user's positions, and the corresponding jobs required to be performed in those positions. Further, the determinator, 204, can also identify from the learning database the learning materials that one should have acquired to accomplish one or more of these jobs.

Figure 5:
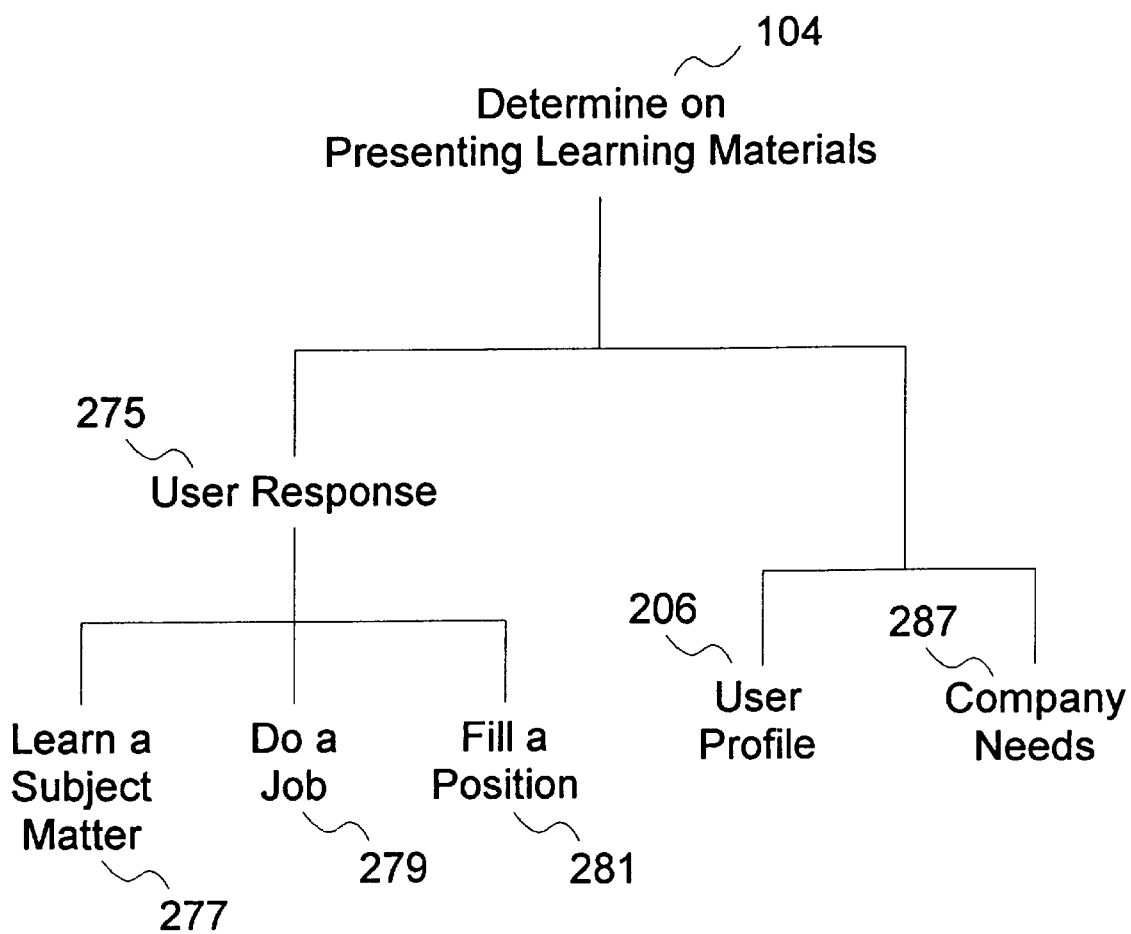
FIG. 5 shows a number of rules to determine if learning materials should be presented in the present invention.

FIG. 5 shows a number of rules applied by the learning determinator, 204, to determine (step 104) if learning materials should be presented. In one embodiment, the determinator, 204, determines based on the user's response (step 275). The learning determinator, 204, can ask the user a question. For example, the determinator, 204, can ask the user if she wants to learn a subject matter (step 277), such as how to invest in bonds. In another approach, the determinator, 204, asks the user if she wants to do a certain job (step 279), such as writing a program for an embedded controller.

Figure 6:
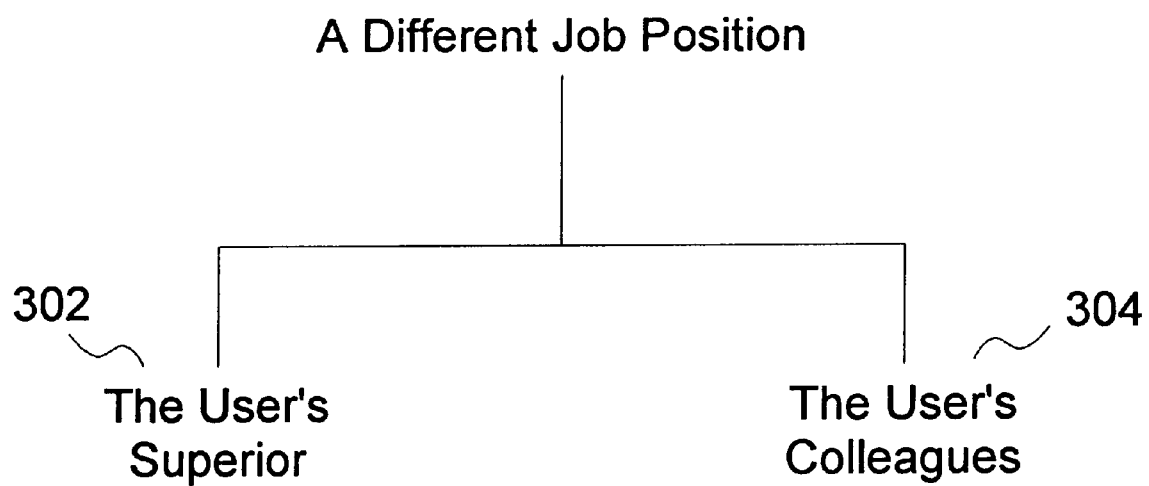
FIG. 6 shows examples of different job positions for a user in the present invention.

In yet another embodiment, the determinator, 204, asks the user if she wants to fill a certain job position (step 281). FIG. 6 shows examples of different job positions for the user to fill. The position can be the user's supervisor's or superior's position, 302, or the positions of the user's colleagues, 304. For example, the user is a marketing manager, the determinator, 204, can ask her if she wants to be a finance manager. If the user wants to, which can be in the form of clicking a dialogue box, the material presenter, 210, presents materials to the user. As an illustration, if the user wants to be a finance manager, the determinator, 204, may decide to present certain learning materials regarding finance to her.

In another embodiment, the learning determinator decides without asking the user. In one embodiment, the decision depends on the needs, 287, of the company. For example, due to changes in the market place, the company requires their sales personnel to understand the Russian culture so as to sell its products in Russia. Due to such change in needs, the learning determinator, 204, decides that learning materials on Russian culture should be presented to the user.

Figure 7:
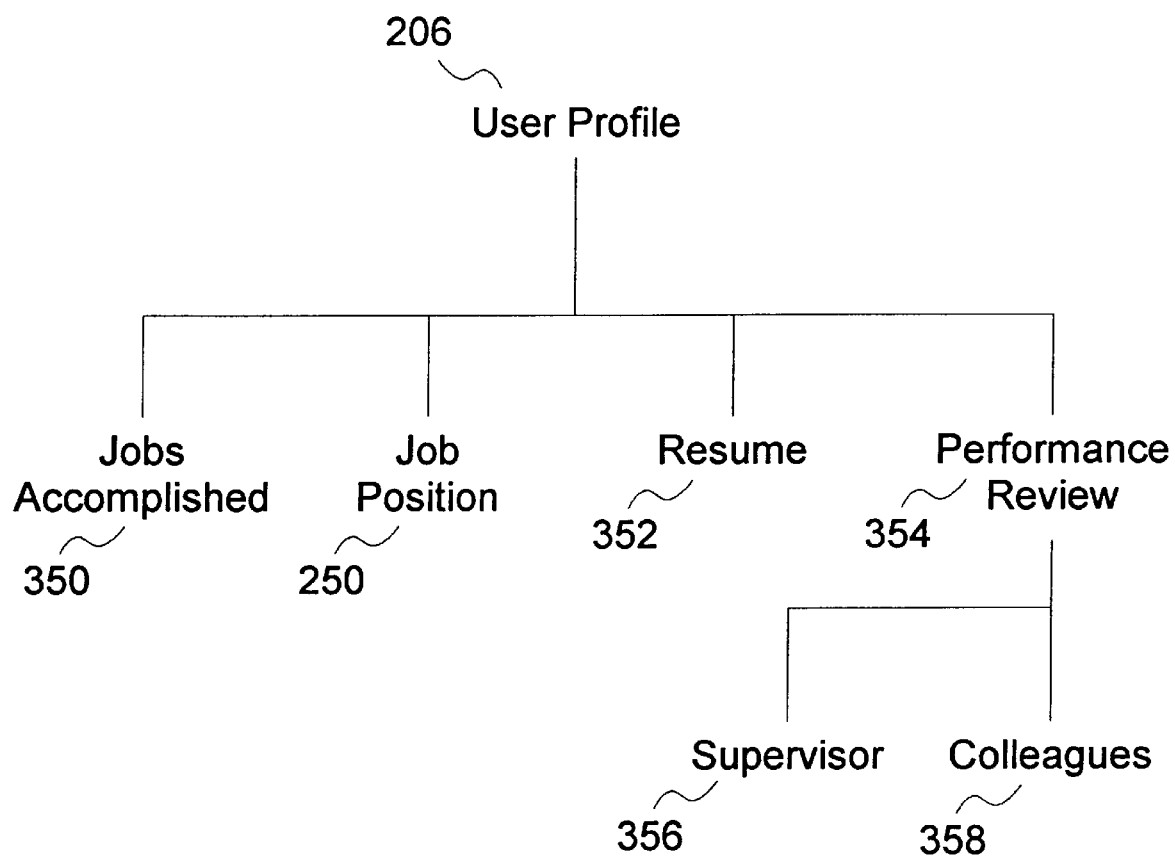
FIG. 7 shows examples of characteristics of the profile of a user in the present invention.

In yet another embodiment, the determination is based on a profile of the user, 206. FIG. 7 shows examples of characteristics in a user profile, 206. One example is the user's job position, 250. Another example is the user's resume, 352. For example, the company wants to hire a technical writer for a biochemistry product, but can only find a writer good in chemistry. Based on the user's resume, which shows that the writer does not have sufficient background in biology, the determinator, 204, decides to present learning materials on biology to the user.

Information in the user profile, 206, can include the jobs accomplished, 350, by the user. For example, if the user has written numerous programs in C, the determinator, 204, might decide that learning materials on the programming language C++ should be presented to the user.

In yet another embodiment, characteristics in the user profile, 206, include the user's performance review, 354, previously entered into the apparatus, 200, by, for example, the user's supervisor, 356, or her peers, 358. Her supervisor, 356, may indicate that she is weak in word processing skills, while her peers, 358, may indicate that the user is weak in communication. These information can be collected and stored in the user profile, 206. Based on such information, the determinator, 204, can decide that certain materials should be presented to the user.

Some of the above determination factors can be mixed and matched. For example, information in the user profile, 206, and the company needs can be combined to make the determination. As an illustration, the user has successfully designed a 50 MHz digital-to-analog converter. Due to changes in the market place, the company needs to sell a 500 MHz converter. The determinator, 204, based on such information, decides that the user should learn microwave integrated circuit technology. In another example, the user's preference is also taken into account. For example, the company needs people to sell in Russia and Malaysia. Such requirements are presented to the user. It will then be up to the user to decide which sales position she is interested in. From her preference, the determinator decides the types of learning materials to be presented to the user.

Figure 8:
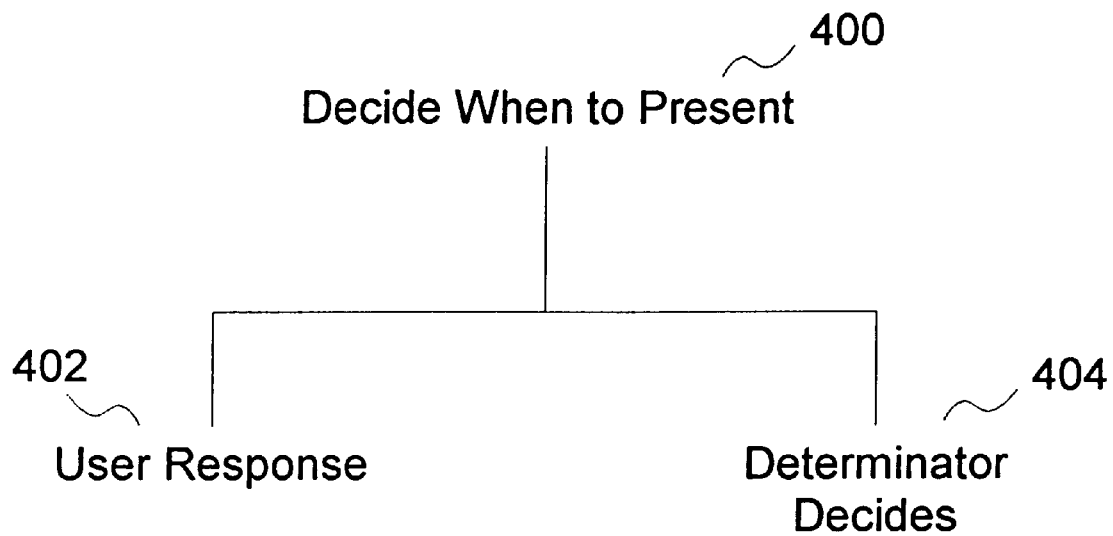
FIG. 8 shows one embodiment on deciding when to present learning materials in the present invention.

If materials should be presented, in one embodiment, the time to present can be decided in a number of ways, as shown, for example, in FIG. 8. It can be the material presenter, 210, or the determinator, 204, deciding (step 404) when to present the materials to the user. In one embodiment, the decision is based on the user's schedule or calendar, which can be in the user profile, 206, or has previously been entered into the apparatus. For example, the user has meetings from 9 am to 4 pm, today. The determinator, 204, based on such information, asks the user if she wants materials to be presented to her at 5 pm; or the determinator, 204, just tells her that materials will be presented to her at 5 pm today.

In another embodiment, the presenter, 210, first lets the user know that she might have to spend a certain number of hours on the materials. Then, when the user accesses her computer system every day, the determinator, 204, can ask the user if she wants to reserve 45 minutes that day to learn. If she wants to, the determinator, 204, can ask the user to decide when on that day she wants to learn. Then, at the specified time, appropriate learning materials will be presented to the user. This approach depends on the user's response (step 402) to set the time to learn.

In one embodiment, learning materials can be from the company's documents. A document can include pictures, figures and text, which can be in digital format. In another embodiment, a document includes information that can be processed in digital format. A company database can store the documents previously prepared by the employees of the company. These documents encapsulate a lot of the company's knowledge, and can be used as learning materials for the user. Such learning materials can also provide up-to-date information to the user because some of the documents might have just been generated by the employees. Reading other's documents can be a good way to learn. This is similar to the idea of learning by observing what others have done. Sometimes, this learning approach is known as learning through osmosis.

In this embodiment, at least some of the learning materials for the user may be generated from the company documents, which can be in a company's database. At least some of these documents are typically not available to the public. In one embodiment, the database can also store documents related to the company's line of business. Such related documents can be from the company's customers, or can also be publicly available documents. In one embodiment, such related documents are also known as company documents.

Figure 9:
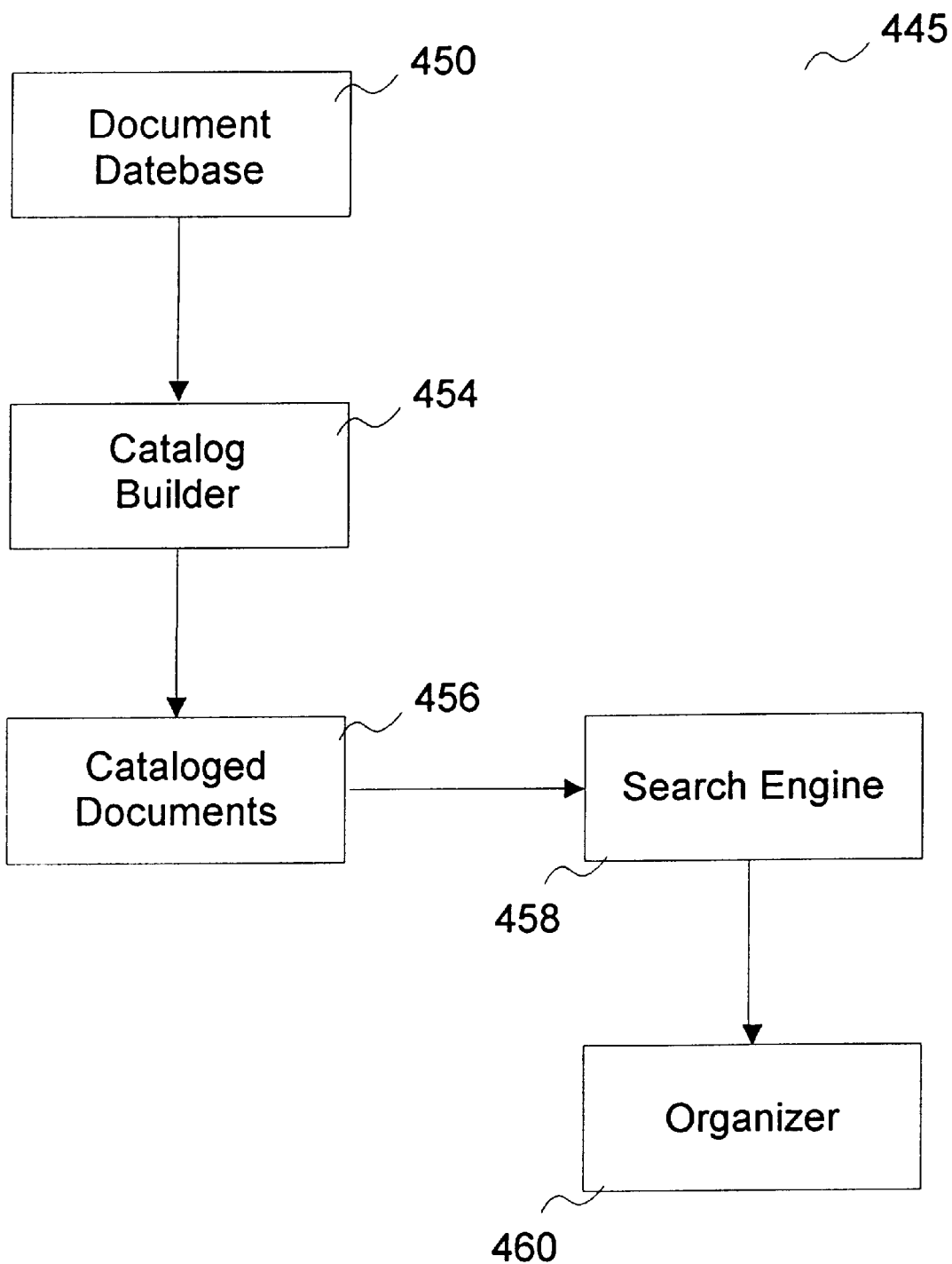
FIG. 9 shows one embodiment in the present invention of extracting documents in a database.
Figure 10:
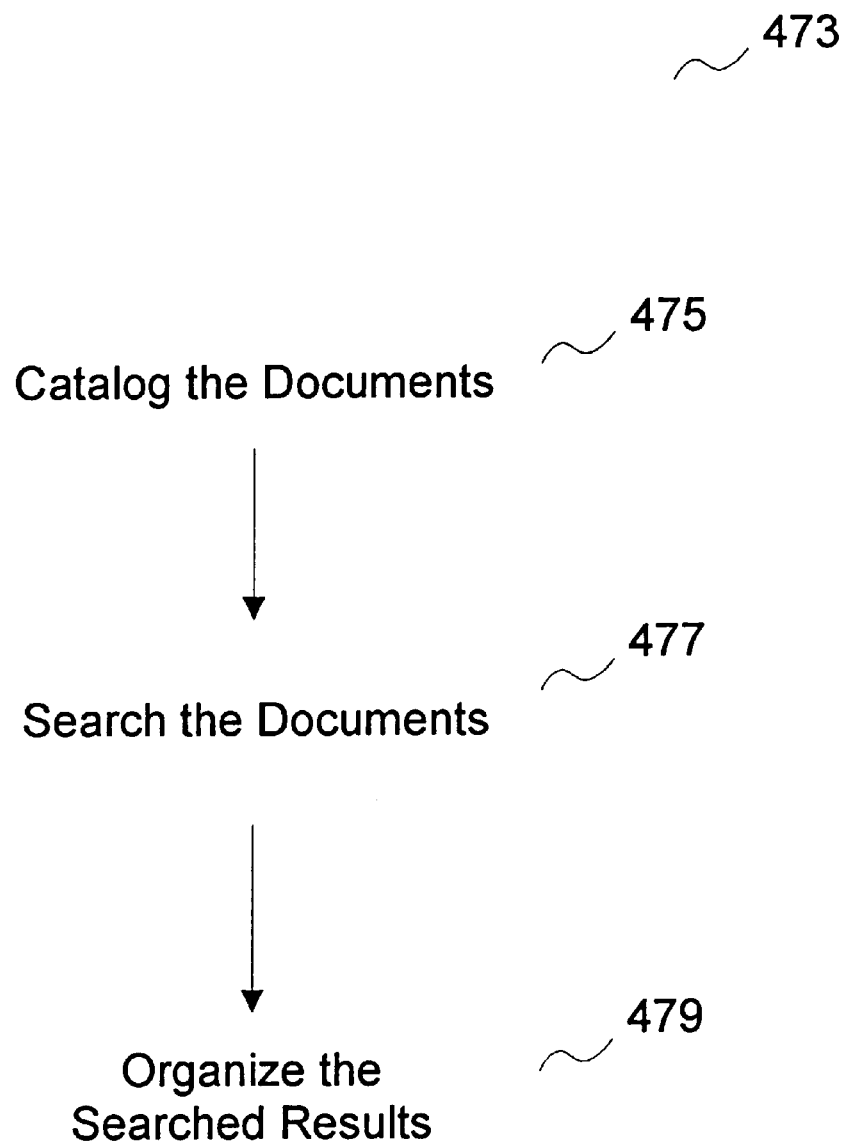
FIG. 10 shows one approach to extract documents in a database using the present invention.

FIG. 9 shows one embodiment, 445, of extracting documents from the database by the learning determinator, 204, for the user to learn. FIG. 10 shows one approach, 473, of using the embodiment in FIG. 9 to extract documents.

In one embodiment, the information contained in the extracted documents has at least one common structure or characteristic, or is not of free form. Those documents are structured documents. As an example, the formats of the documents have one or more common characteristics. To illustrate, the documents are letters written with a word processor by the company's secretaries. Such letters usually have the common structure of having the company's name as its header, the company's address and a date at specified locations.

In another embodiment, the extracted documents can fit into specific templates. In one embodiment, a template can shape an extracted document when the document was created, or can describe or identify the shape of the extracted document. Every document with the same template can include identical text or formatting that is based on the template. Such text or formatting can be the style of the documents or can include macros, which can be modules, where each module can denote many operations. For example, in one set of extracted documents, the template is for the company's annual report; then the template includes sections covering the company's revenue, cash flow, balance sheet and forecast.

In one embodiment, the learning determinator, 204, includes a catalog builder, 454, a search engine, 458, and an organizer, 460.

The catalog builder, 454, can group the structured documents in the database under different categories. The documents grouped or categorized can be known as cataloged documents. In one embodiment, the catalog builder, 454, builds the catalog based on the organization chart, or the linked job titles of the company. In another embodiment, categories in the catalog is similar to nodes in the organization chart, or the linked job titles of the company; for example, each category in the catalog corresponding to a job position or a job title. In another embodiment, a job position can be linked to more than one category. In yet another embodiment, at least a part of the catalog is built based on key words in the documents, or templates used in the documents.

The catalog can be reduced in size. In one embodiment, one specific catalog also depends on at least one characteristic of the profile of the user. It can be called a personalized catalog. For example, only categories related to the user's job position are included in this specific catalog. So, in one example, only categories for the user's job position, the user's direct superiors' position and the job positions of the peers of the user are included. This specific catalog can be much smaller than the catalog describing all of the company's job positions.

The catalog builder can also be responsible to reference each document by, or group each document to, its corresponding one or more categories. In one embodiment, each document, in addition to its content, also includes one or more attributes describing the document. These attributes are information regarding the document. But, unlike the content the document, these attributes typically are information that do not have to be directly conveyed to the user receiving the document, before the user can learn from the document. For example, attributes can include the name of the person who creates the document, the job she was doing when she created the document, its version, and the identification of the document's template, if there is one. Note that the document can be received by the user, so if she wants to, she can decipher the document to get the attributes.

The document categorizing process can depend on at least one of the document's attributes. For example, if the user is an architect, and she has created a design of a building, then the attributes of the document holding the design can include her job title. Based on the job title, the document can be grouped to, categorized to or referenced by the category of an architect in a catalog. In another example, the shape or format of a document can be described by a template. That template fits into a category of a catalog. Then that document can be referenced by that category, which can be related to a specific job.

Figure 11:
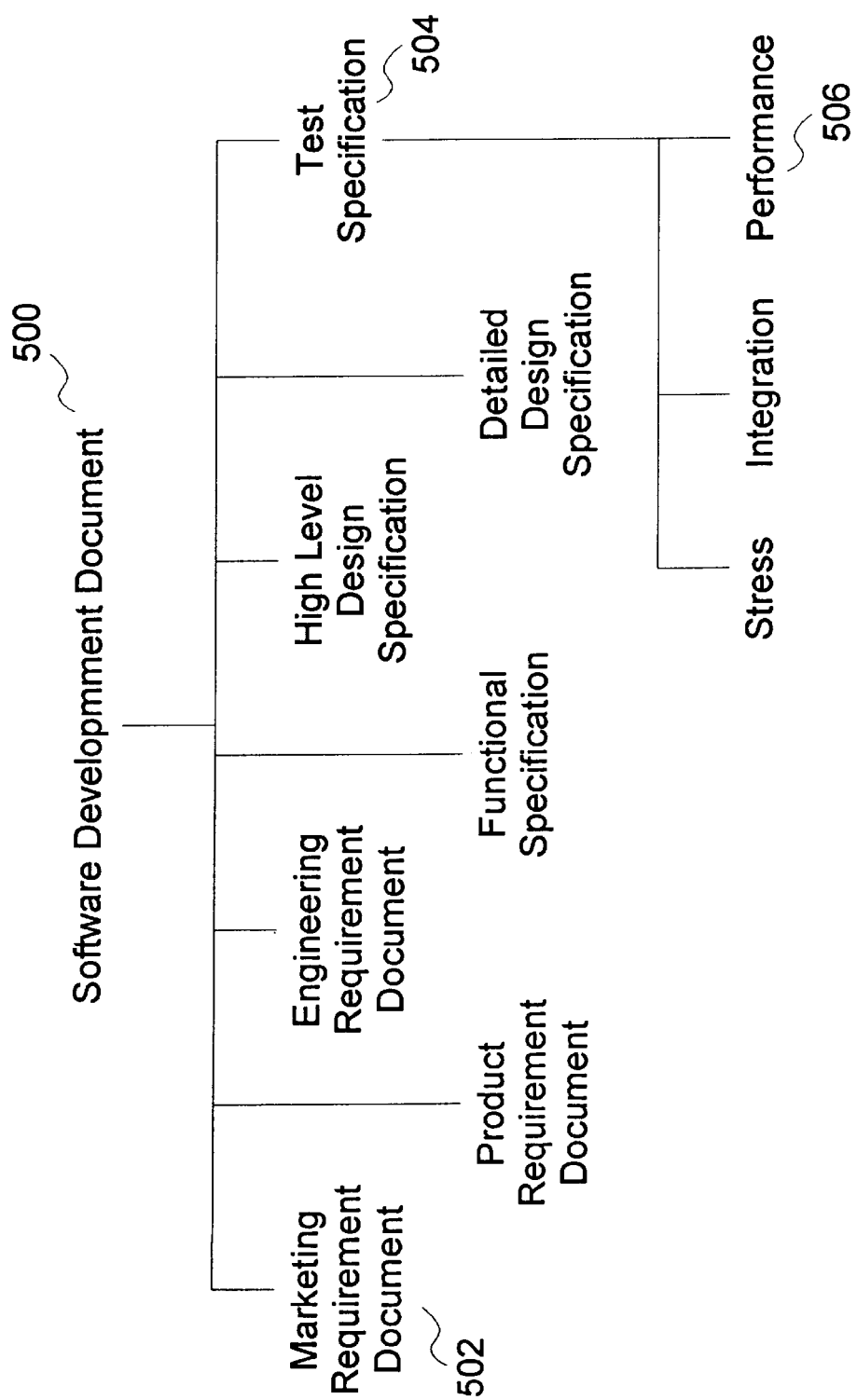
FIG. 11 shows an example of how software development documents are cataloged in the present invention.

FIG. 11 shows an example of how software development documents, 500, can be categorized into cataloged documents. If the company is in software development, typically, some of the documents in the company can be categorized as shown in FIG. 11. After cataloging (step 475), the documents are categorized accordingly, and become cataloged documents, 456. As an illustration, all of the marketing requirement documents, 502, are cataloged, and may be stored under the same category.

In one embodiment, the learning determinator, 204, decides on the documents the search engine, 458, should search for among the cataloged documents, 456. As an example, the user is a software test engineer, and the learning determinator, 204, decides that learning materials on performance test specification, 506, of an ATM networking software program should be presented to her. The search engine, 458, in the learning determinator, 204, identifies all of the documents related to such test specifications under the category of performance test specification, 506, and extracts them from the database.

As an illustration, the company does not have any performance test specification, 506, of an ATM networking software program. Then, the searcher can identify related documents based on one or more rules. One set of such rules may be relationship rules, which group related terms, such as related jobs, together. In one approach, if the searcher has to search for any one term, the searcher automatically searches for all of its related terms. For example, the term, frame relay, is related to the term, ATM. One relationship rule groups the two terms together. Although the company does not have any documents on a performance test specification, 506, of a ATM networking software program, the company has such documents for frame relay. Based on the relationship rule, the search engine, 458, also searches for documents on performance test specifications, 506, of frame relay software. Such documents are identified, and extracted for the user.

Note that cataloging the documents reduces the amount of searching required. However, it is not necessary to catalog the documents before they can be searched. One embodiment does not include the catalog builder and the cataloged documents. Searching can be performed directly on all of the documents in the database. In this embodiment, searching can be based on key-words, including the job titles or the job position. The query can be based on the job description, which describes, for example, the type of work involved in the job.

Figure 12:
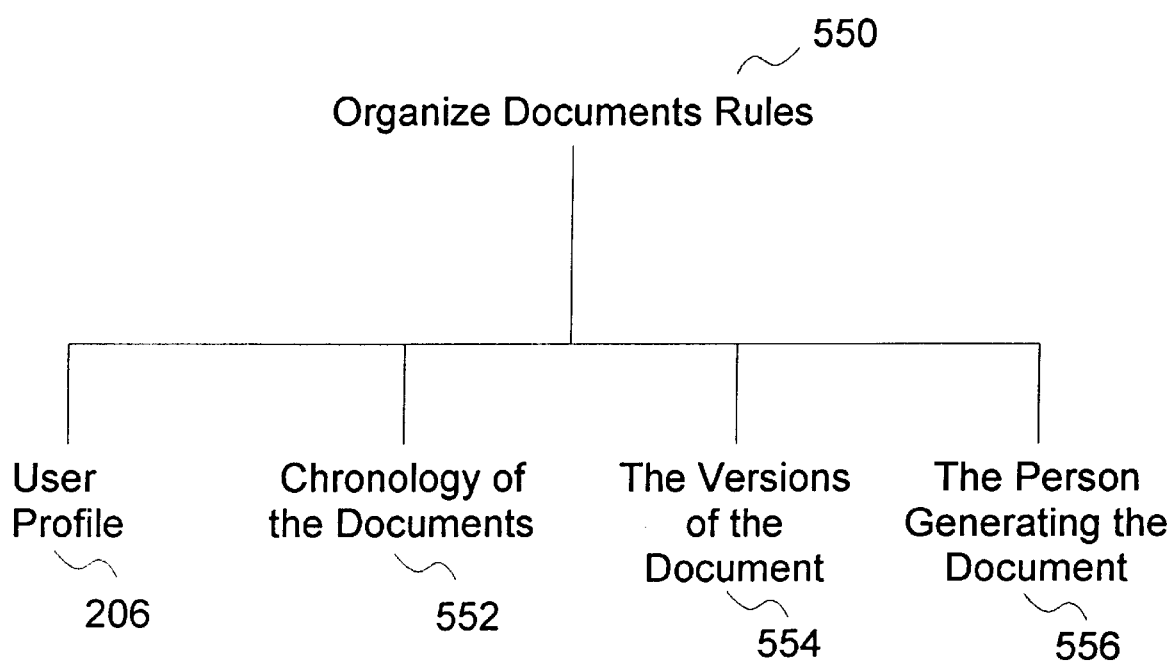
FIG. 12 shows examples of rules to organize extracted documents using the present invention.

After the documents are extracted, they can be organized for presentation. FIG. 12 shows examples of rules, 550, to organize extracted documents in the company. In one embodiment, organization includes prioritizing the extracted documents, so that, for example, higher priority documents can be presented before lower priority documents.

The documents can be organized based on the company information, which can be information not available to the public. For example, the company information includes the document chronology, 552, the document version, 554, the person generating the document, 556, and the profile, 206, of the user.

As mentioned, one rule to organize is based on the chronology, 552, of the extracted documents. For example, documents that were recently created have higher priority than those created long time ago.

Another rule is based on the versions, 554, of the documents. It is typical to have a number of iterations before the final document is produced. Each iteration can be a version. One organization rule is to rank the older versions with higher priority, and to present them before the newer versions. Such a rule helps the user understand the process to get to the final document.

The identity, 556, of the person generating the documents can be used for an organization rule. For example, if the originator is the user, the document has a low priority.

Another rule includes information in the user profile, 206, such as the user's job position. For example, a document is related to more than one job position. One rule can be that such a document is of lower priority as compared to a document that is related only to the user's job position. One or more of such rules help organize the extracted documents.

Figure 13:
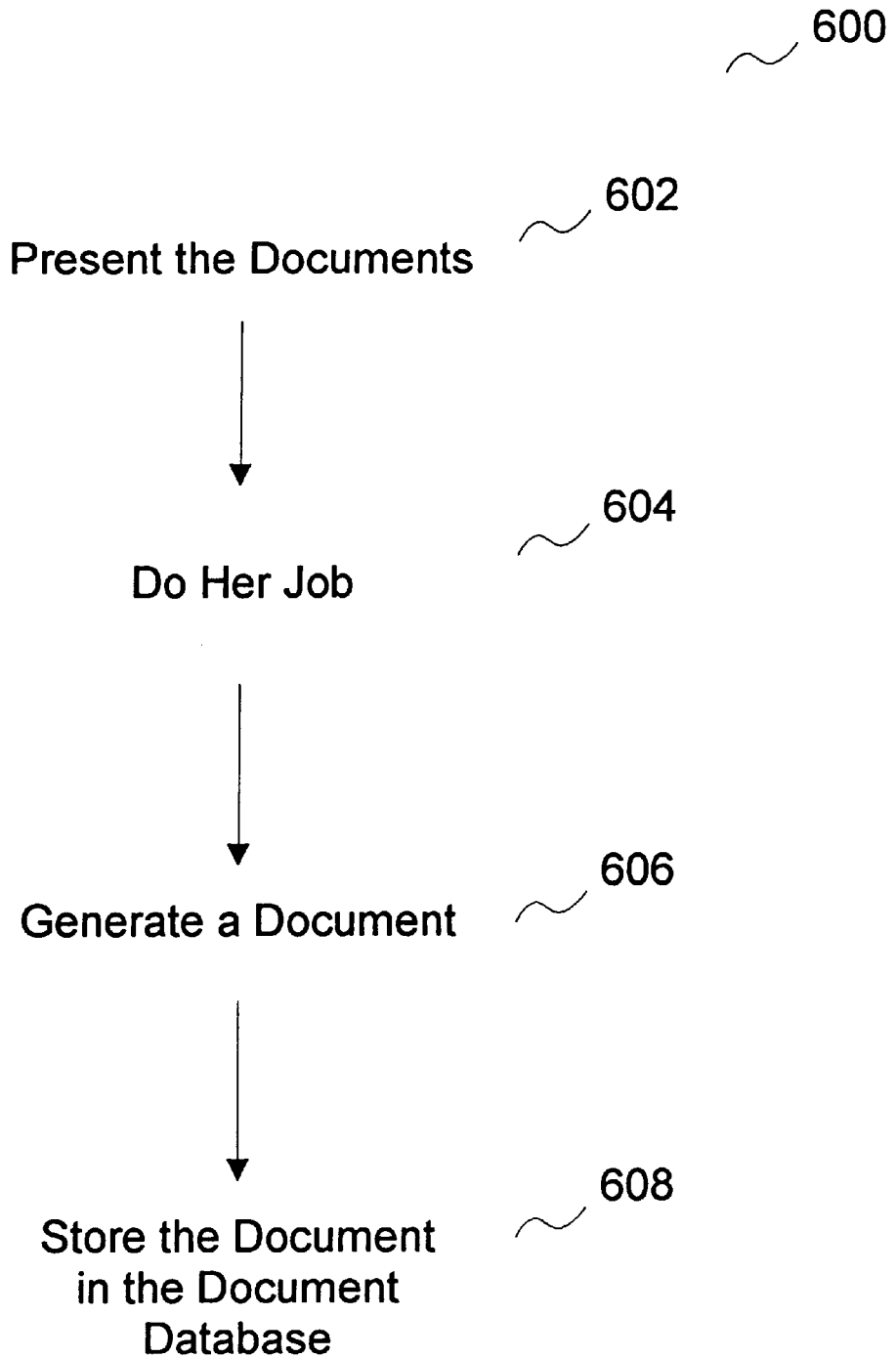
FIG. 13 shows one set of steps to generate a document in the document database of the present invention.
Figure 14:
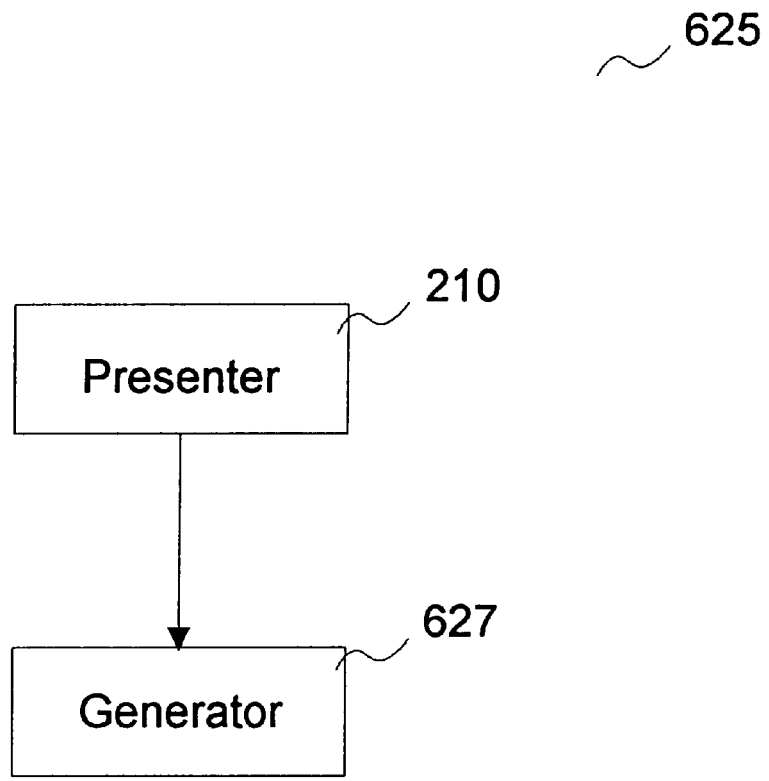
FIG. 14 shows one embodiment to generate a document in the document database of the present invention.

Through learning from the presented materials, the user can produce her own documents, which can be used as structured documents in the database. FIG. 13 shows one set 600 of steps to generate a document for the document database. FIG. 14 shows one embodiment, 625, to generate the document. After leaning materials are presented (Step 602) by the presenter, 210, to the user, she does (Step 604) her job with the help of a generator, 627. This can be her word processor, simulator, or the like. For example, she starts to write the performance test specification of the ATM networking software program. As she does her job, at least one such document is generated (Step 606), such as a version of the performance test specification. That document is stored (Step 608) in the document database, 450. Usually she will generate, through the generator, 627, many versions. In one embodiment, all of these versions are stored.

In one embodiment, the documents created by the user are automatically cataloged. For example, the profile of the user can be in the apparatus, and the job the user is performing can also be in the apparatus. Based on such information, the one or more documents generated can be automatically categorized. For example, the documents generated by the user in the above example can be classified under the category of performance test specifications, and can be stored as such cataloged documents. Next time when another user needs to learn about a performance test specification, there will be one more set of documents to present to him. As stated above, the set of documents may have many versions. The search engine, 458, may limit the number of versions to be extracted, and the organizer, 460, may determine the priority of those extracted documents to be presented to the other user.

Figure 15A:
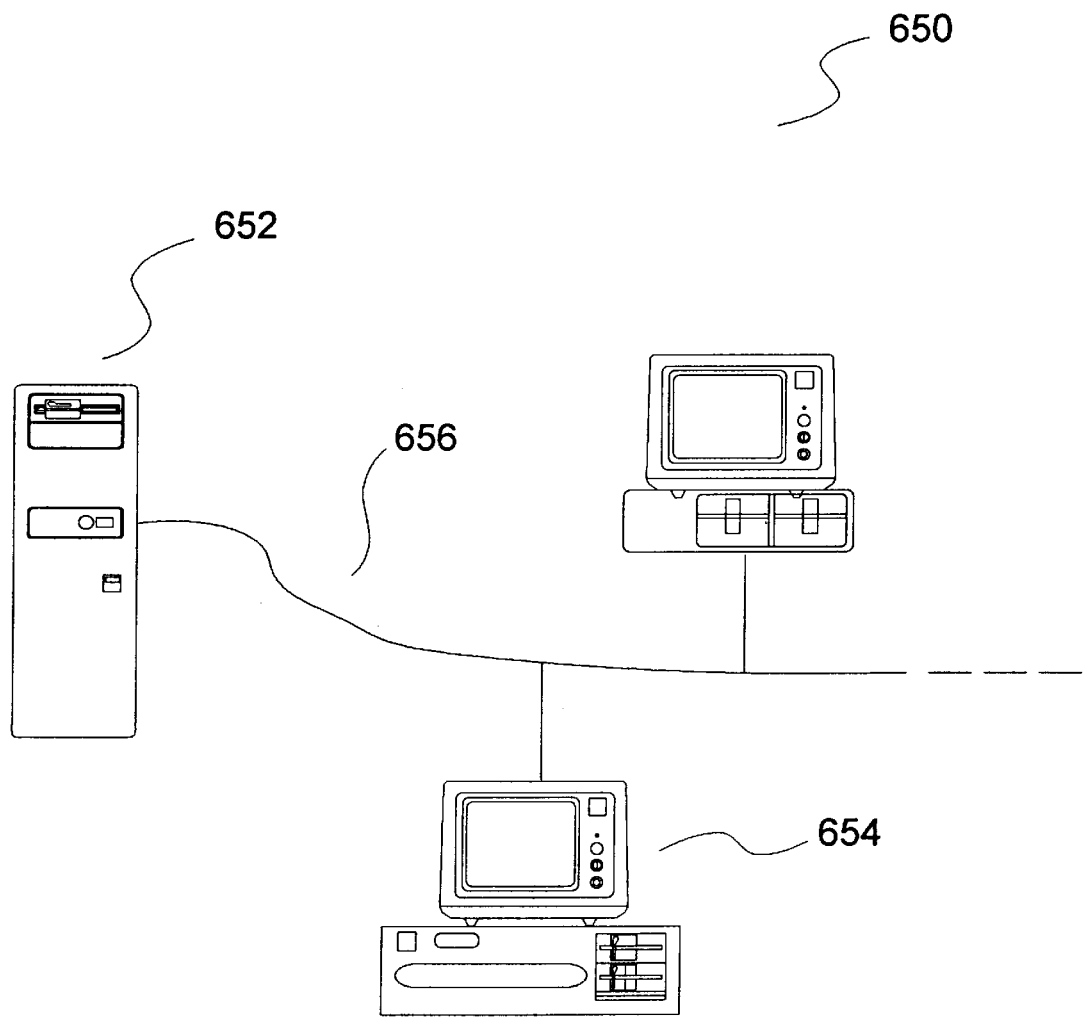
FIGS. 15A–B show examples of hardware to implement one embodiment of the present invention.
Figure 15B:
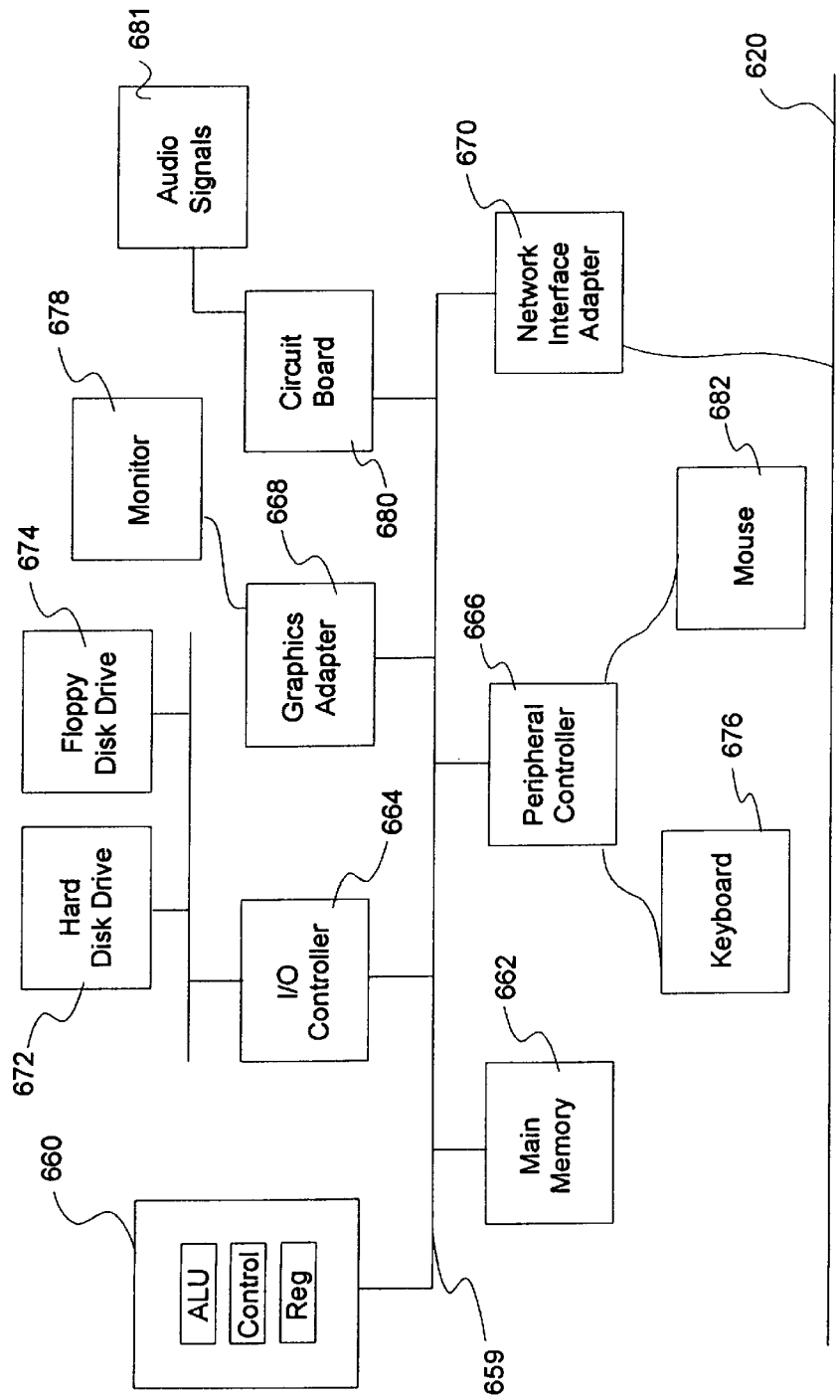

FIGS. 15A–B show examples of hardware to implement one embodiment of the present invention. FIG. 15A shows one physical embodiment 650 implementing one embodiment of the invention, preferably in software and hardware. The embodiment 650 includes a server computer 652 and a number of client computers, such as 654, which can be a personal computer. Each client computer communicates to the server computer 652 through a dedicated communication link, or a computer network 656.

FIG. 15B shows one embodiment of a client computer 654. It typically includes a bus 659 connecting a number of components, such as a processing unit 660, a main memory 662, an I/O controller 664, a peripheral controller 666, a graphics adapter 668, a circuit board 680 and a network interface adapter 670. The I/O controller 664 is connected to components, such as a harddisk drive 672 or a floppy disk drive 674. The peripheral controller 666 can be connected to one or more peripheral components, such as a keyboard 676 or a pointing device 682. The graphics adapter 668 can be connected to a monitor 678. The circuit board 680 can be coupled to audio signals 681; and the network interface adapter 670 can be connected to the network 620, which can be the Internet, an intranet, the Web or other forms of networks. The processing unit 660 can be an application specific chip. In another embodiment, the client computer 654 is a thin-client, with most of the its physical components in the server computer, 652.

Different elements in the present invention may be in different physical components. For example, the apparatus may be in the client computer. In another embodiment, the learning determinator, 204, the user profile, 206, the retriever and material presenter, 210, are in the client computer, while the learning database is in the server computer. In yet another embodiment, the learning database and the user profile, 206, are in the server computer, and the retriever, the learning determinator, 204, and the material presenter, 210, are in the client computer. In one embodiment, the client computer only includes the material presenter, 210.

It should be obvious to those skilled in the art that different elements in the present invention can be implemented in hardware or software or both. For example, the determinator can be written in software, or can be on a circuit, such as a field-programmable-gate-array, where the program embodying the determinator is burnt into the circuit. As another example, a processing unit 660 can implement the learning determinator; a main memory 662 can store the user profile; the same or a different processing unit can implement the retriever, and the material presenter; and the same main memory or a different memory can store the learning database.

In one embodiment, the learning database does not have the required learning materials. However, a learning module includes information, such as the place and the time the learning materials are available to the user. In another embodiment, the determinator, 204, can access information, such as through the Web, regarding when and where to learn. Learning can be through an extension class from a University in live instructor-led courses. Based on the user profile, 206, the determinator, 204, may be aware of the user's home and company address, and the user's availability, such as her schedule or calendar, which can indicate, for example, when she is planning to take a vacation. Through such information, the learning determinator, 204, can provide learning options to the users, which can depend on the proximity of her work and home relative to the learning location, and her availability. After the user selects one of the options, the determinator can also help the user register, through, for example, the Web.

In another embodiment, the materials to be presented to the user also depends on the capability of the user. For example, if the user is highly ranked in the company, as shown by the user profile, 206, only essential materials are presented, with simple materials ignored.

The present invention illustrates a number of embodiments where the job position related to the user is the job position occupied by the user. Note that the job position related can be the job position the user is interested in, or some other job positions. Then, based on the retrieved job position, the corresponding learning materials may be identified, and presented to the user.

The present invention describes the learning determinator determining whether learning materials should be presented to the user. Note that in one embodiment, this determining step is before identifying the learning materials, but after identifying the job position, or the one or more jobs to be done. In another embodiment, this determining step is after identifying the learning materials.

The present invention describes methods to help the user. In one embodiment, the company, based on its needs and based on the user's profile, selects the user to see if materials should be provided to her. In this embodiment, the company can have a job need. Then, based on information on its employees, the company may pre-select a user to see if materials should be presented to her.

In one embodiment, the one or more jobs related to a job position, with the descriptions for the jobs, are stored in the profile of the user occupying that job position.

There are situations when it may not be important whether the user is associated with a company. For example, the company is in the process of laying off the user, the user is in the process of leaving the company, or the user is about to graduate from a school. They need job counseling to help them find a job.

Figure 16A:
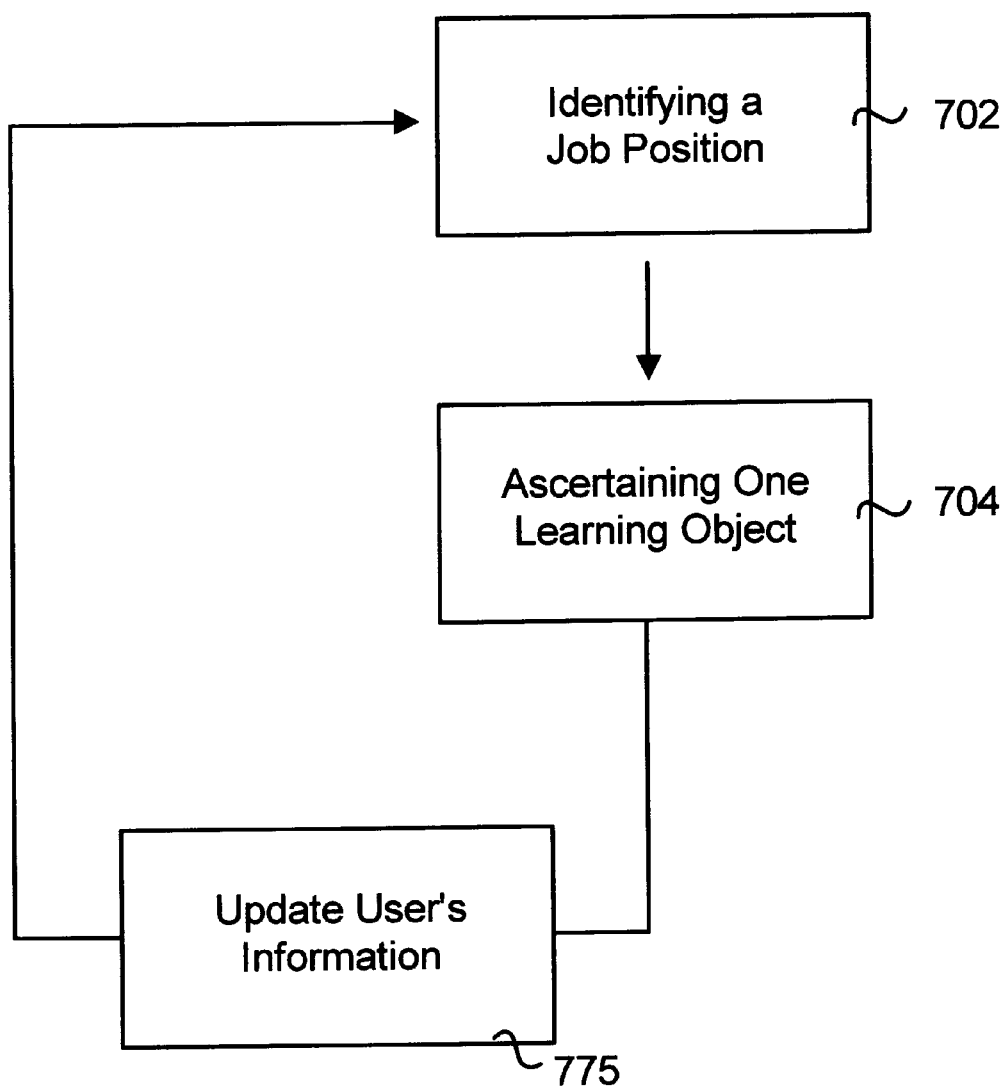
FIGS. 16A–B show one set of steps and an apparatus to identify a job position for a user, who may not be associated with a company, in the present invention.
Figure 16B:
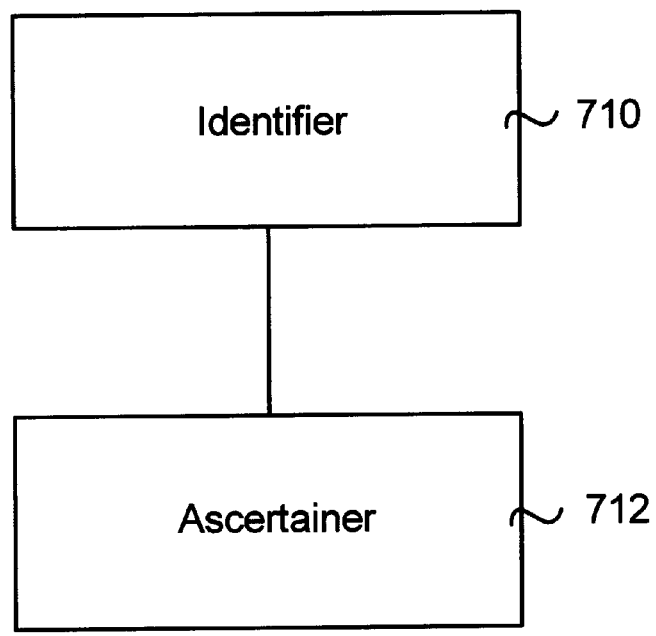

One embodiment does not need the retriever, 202. As shown in FIGS. 16A–B, the learning determinator 204 can include an identifier, 710, configured to identify for the user (Step 702) a job position, and can also identify the one or more jobs needed to be done for the job position. The identification process is based on at least one attribute of the user's profile. The learning determinator 204 further includes an ascertainer, configured to ascertain (Step 704) at least one learning objective for the user to select learning materials to prepare the user for the job position. In this embodiment, if the user presently is holding a job, its job position can be an attribute in her user's profile.

Figure 17:
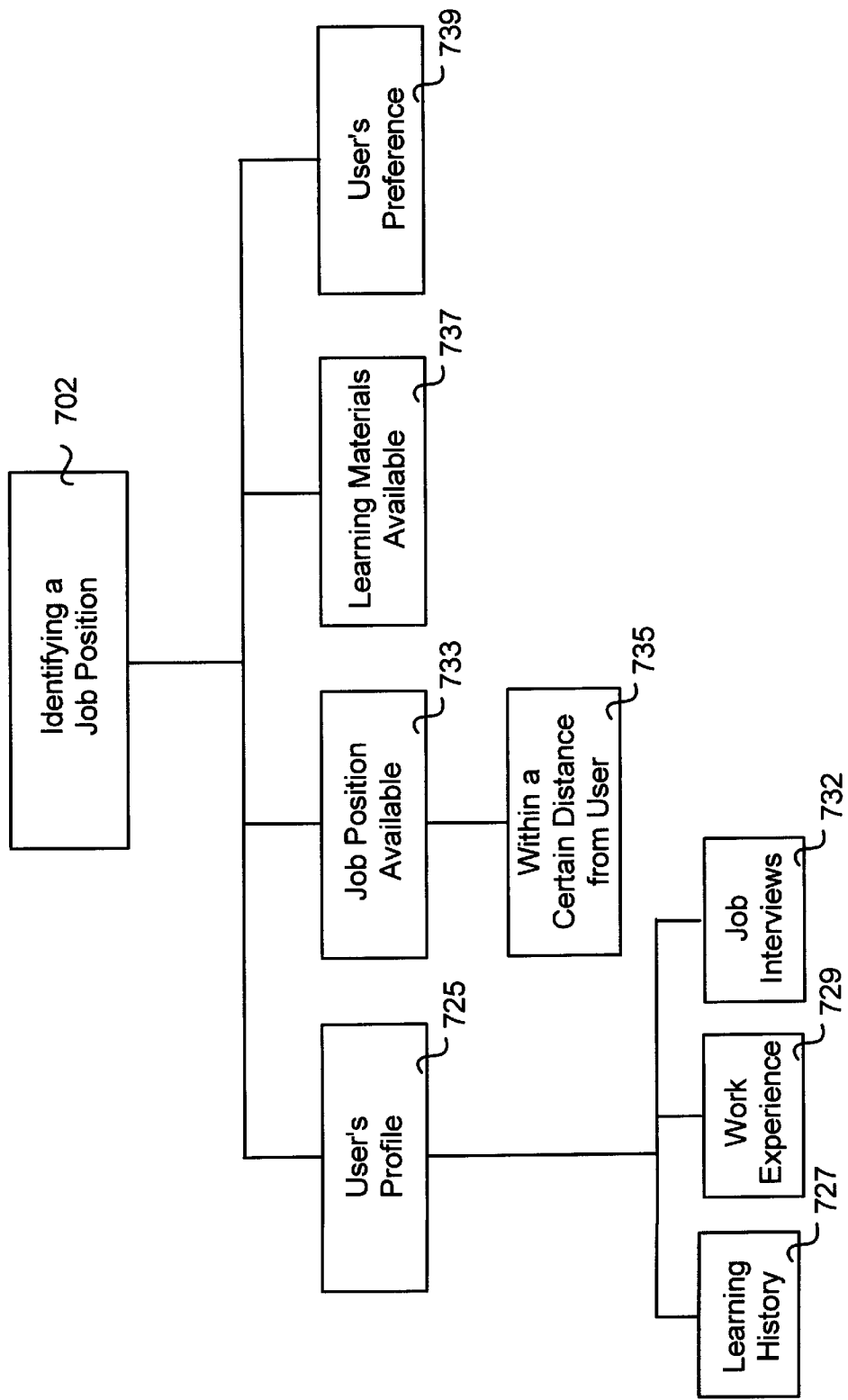
FIG. 17 illustrates examples of factors to identify the job position in the present invention.

FIG. 17 illustrates different criteria used by the identifier 710 to identify the job position. One criterion is based on at least one attribute of the user's profile, 725, such as the user's learning history, 727, and the user's work experience, 729.

The user's learning history can include one or more of the following: (i) the one or more degrees she received and when she got them; and (ii) the titles of the classes she took, when she took them, and whether she graduated from them.

The user's work experience, 729, can include one or more of the following: (i) her current job position, (ii) her previous job positions, and when she held them; (iii) the job functions she performed, such as within the past seven years, and when she performed them; and (iv) the projects she worked on, such as within the last ten years, when she worked on them, and for how long.

As an example, typically a user would be more efficient, productive and satisfied if the new job is related to her prior job, allowing her to apply her knowledge and experience. She is more likely to prefer to work on jobs that are similar to the projects she has been working on. Hence, if she has spent many years working in a certain subject area, her new job in a new company, at least initially, should be in a similar area. Thus, rules to help identify job positions include the subject area of, and the duration the user being involved in, the projects she worked on.

Based on the number of years she has been in a company, or at a job, the identifier can identify whether she is a risk taker, who would feel comfortable in making more significant career changes. For example, if she works for the same company and is at the same job for the past ten years, probably she is not a risk taker. The identifier should then avoid selecting jobs that are not related to what she has been doing.

One embodiment includes rules that combine both the user's learning history and the user's work experience. For example, if the user has been out of a job for a while, and has been involved in a training program, the user probably wants to find a job that is more related to the subjects of the training program than the previous job she was in. Similarly, if the user performs very well in her training, again she might prefer jobs more directly related to her training, than to her previous job position. Such rules can also apply to recent graduates or soon-to-graduate students.

The user's profiles can include results of her prior job interviews, 741. In one embodiment, the user has the option to enter into the system feedback or results from job interviews. This serves as a reality check as to the direction she was heading. If the results from a number of prior job interviews are quite negative, the identifier would de-emphasize those job positions.

Many other attributes of the user's profile can be useful to determine a job position for the user. For example, if she does not like to travel, probably, the identifier would de-emphasize job positions that require relocation.

Another criterion to identify one or more job positions is based on job positions available, 733. In one embodiment, to identify the job position for the user, the identifier, 710, identifies job positions available to be filled. This identification process can be limited to those within a certain distance from the residence of the user, 735. The number of job positions available can depend on forecasts. For example, the user might need 3 months of training, and the job positions available can be based on the estimated availability of jobs in three months.

Another criterion is based on the availability of learning materials, 737. For example, the user is a painter, who would like to be a cartoonist. There may not be any such classes offered in the next six months. In one embodiment, the learning materials may be delivered from a computer through, for example, the Web, or from other types of storage media.

Yet another criterion is based on the user's preference, 739. For example, the user is only interested in a nine-to-five job that pays more than $30,000.00 a year. She might be interested in jobs unrelated to her own, for reasons such as moving into a hot labor market, with better paying jobs; or moving into a less dynamic, but more stable and secure job environment. The user can enter her preferences into the system by selecting different options from a set of multiple choice questions, which can be provided by the identifier. In one embodiment, user's preferences are attributes of the user's profile.

The above criteria can be represented by different rules, which can be pre-stored in the learning database. The rules may also be embedded in the software or firmware run by, or embedded in the hardware of, the identifier. In identifying a job position, the identifier applies the rules. Application of rules by rule-based engines should be obvious to those skilled in the art, and will not be further described.

In one embodiment, rules are prioritized. For example, the rule of high priority is that she would not work for a company more than 100 miles away from her residence. Setting such priority can be based on her preferences and priority-setting rules. An example of a priority setting rule is that if she has carpal-tunnel syndrome, the job position identified does not require typing.

In one embodiment, the above criteria or rules are optimized based on a set of optimization rules and user inputs to identify one or more job positions available for the user. Numerous optimization processes are available, and will not be further described in the present invention.

In one approach, the identifier starts from the user's preference and the job position availability to reduce the types and the number of job positions available for the user. For example, the user prefers her company to be in her city of residence. This will reduce her options based on the number of job positions in her city. If the user prefers to change her profession, then the availability of learning materials becomes important early on in the analysis. For example, if she prefers to change to become a type of graphic designers within one year, whether there are such classes offered in her city in the next six months would be quite important in the identification of job position. After focusing by the user's preference and the job positions available, the identifier further eliminates unsuitable job positions based on attributes in the user's profile.

If more than one job positions are identified, it can be up to the user to pick one. To help her decide, information regarding each of the job positions can be presented to the user. For example, information, such as the average pay, the average work hours, and the benefits available from the company offering the job, could be made available to the user.

Figure 18:
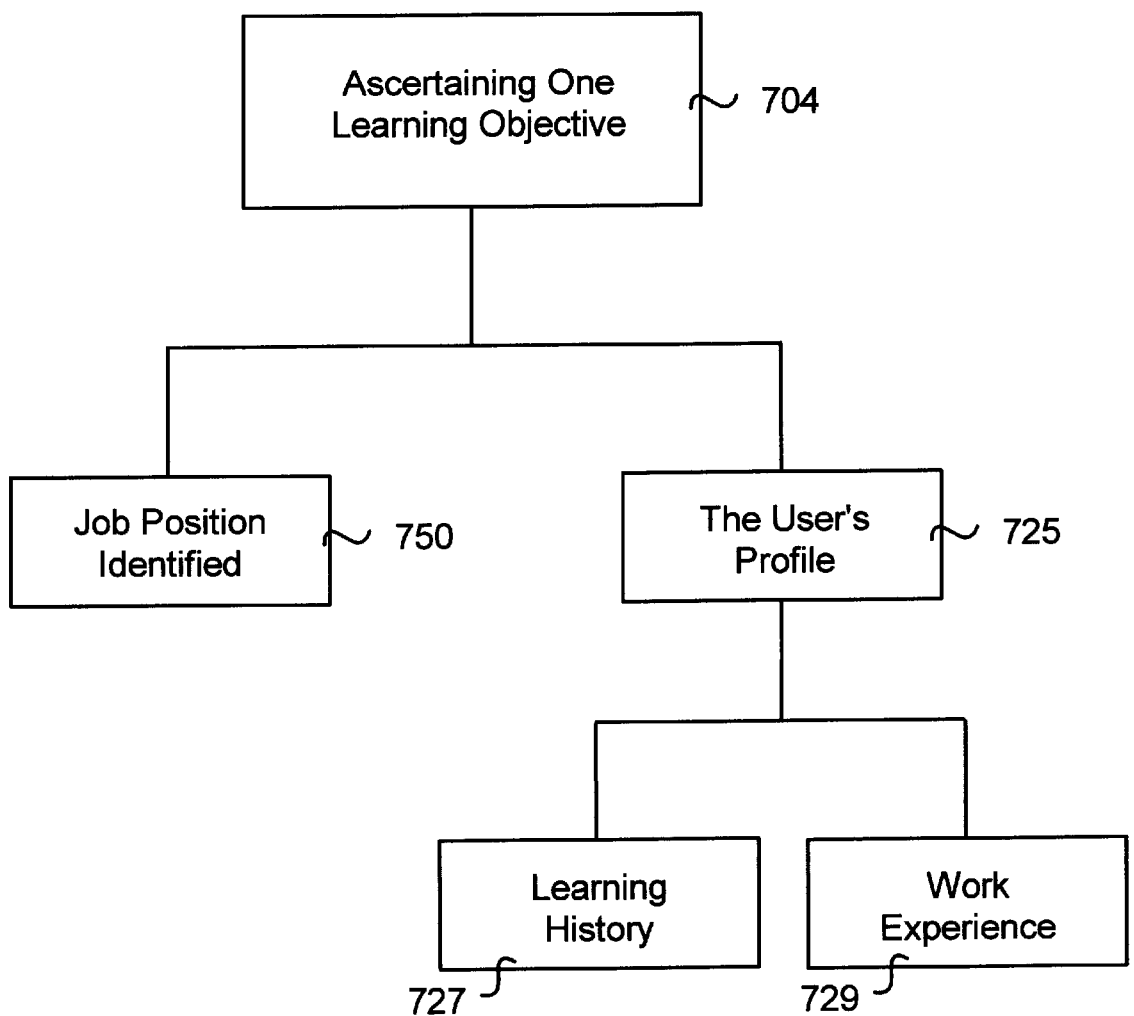
FIG. 18 shows examples of factors to ascertain one learning objective in the present invention.

After the identification of one or more job positions, in one embodiment, the ascertainer 712 would ascertain (step 704) at least one learning objective for the user, if needed. For example, as shown in FIG. 18, ascertaining at least one learning objective depends on the job position identified, 750, and the user's profile, 725. The ascertainer can match the user's prior learning history, 727, and work experience, 729, with the job skills required in the identified job position. The user's work experience provides indications on her experience and knowledge in certain subjects.

As an example, if she spends a lot of time on a project, the ascertainer infers that she understands the project, and the subject areas behind the project, which implies that she does not need to work on introductory materials in those areas. As an illustration of ascertaining learning objective, the ascertainer considers the amount of time to train an average user with the same educational degree as the user for the job position. As an example, a certified C++ programmer needs to take a two-semester class to become an average Java programmer. However, if the user has been working on C++ projects for the past five years, she would only need to take a one-semester class with less introductory materials to become an average Java programmer. As another example, the job position is for a paralegal who understands patent prosecution procedures, and the user has been a paralegal for the last six years, but does not understand the procedures of patent prosecution. Then the learning objective would be to learn such procedures in the next nine months.

Based on the at least one learning objective, the ascertainer could also select for the user learning materials to prepare the user for the job position. For example, the objective is to learn how to speak introductory Spanish in six months; the ascertainer can then select the place and the time to learn, or can identify the computer-based training classes available for her to learn. The identification process can be based on key words. For example, the learning objective is to learn how to write fictions. Then, the ascertainer, based on the words, write and fictions, searches the learning database or other resources for learning materials whose titles have the same two key words for the user.

There might be situations that based on the user's preference, the learning materials selected are not available to the user. For example, the user wants to learn within her own city, but classes are only offered in a city fifty miles away, twice a week. In one embodiment, if, based on the user's preference, the learning materials selected are not available to the user, the ascertainer would suggest that the user should select another job position, or the determinator might re-start the process of job position identification.

In one embodiment, a learning objective sets the category of one or more areas to learn, which provides a broad indication—an objective—as to what the user should learn; and learning materials are more focused. For example, the learning objective is to improve on communication skills. The ascertainer, based on this objective, identifies a number of learning materials for the user, such as courses on public speaking, listening and writing. Her user's profile shows that her weakness is not in writing, and her preference is to take night classes. The ascertainer removes all day classes and writing courses, and allows the user pick one or more of the remaining courses she desires.

The above process of job position identification can be an iterative process. In one embodiment, the identifier can repeat the process of the identification of job positions based on at least one additional piece of information about the user. Again, the repetition can occur after job positions identification, or after ascertaining learning objectives. This additional piece of information helps the identifier more accurately identify the job position suitable for the user. The additional inputs can be entered into the system by the user. For example, after one or more job positions have been identified, the user finds that all of them include certain features she is totally not interested in. Or in another example, subsequent job interviews on the job positions identified provide very negative results. In another embodiment, the additional information is not provided to the identifier by the user, but is provided by another person, or is from the system or apparatus 200 itself. For example, the user has finished learning certain materials, and the apparatus is aware of such activities. The can be because the apparatus provides the learning materials to the user. The additional information could be fulfilling the learning objective ascertained. In another example, the user cannot understand the learning materials to prepare her for the job position. She always fails the test provided by the system at the end of the training process. This piece of information is provided to the identifier. In another embodiment, the additional information can reflect on her additional preference, or other information about the user. Based on the additional input, the identifier repeats the job position identification process to more accurately identify one or more job positions more suitable for the user.

Figure 19:
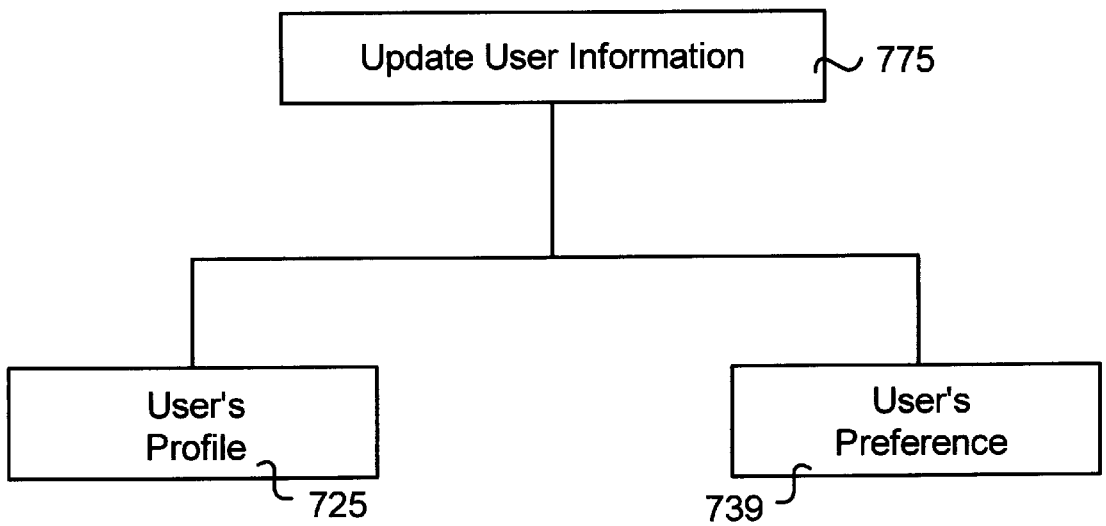
FIG. 19 shows an embodiment of updating user information to keep the information current in the present invention.

As shown in FIG. 19, in another embodiment, the apparatus 200, or the identifier periodically, such as every three months, updates (Step 775) information on the user. This update is based on the response from an inquiry to the user regarding her recent changes, if any. Note also that this update typically occurs after a previous process of job position identification, and might even occur after the step of ascertaining learning objectives so the apparatus already has a fair amount of information on the user. An inquiry is generated for the user to decide if there has been any recent changes in the user's profile, 725, or preferences, 739. The inquiry can be in a multiple choice format, asking the user a number of questions, and can be sent to the user through email. Based on the user's inputs, the identifier updates her user's profile and/or preferences. This will keep her information current. In view of the changes, the identifier can also repeat the process of job position identification and/or ascertaining learning objective for the user. The new result may be to keep the job position identified, but to change a learning objective. For example, the user might have finished working on a certain set of learning materials, and is ready to move on.

In another embodiment, the update is initiated by the user, who can change her profiles and/or preferences. For example, she is going to have a baby, and she only wants to work part-time in the foreseeable future. She is allowed to update her own profile and/or preferences. In view of changes, the identifier can automatically repeat the process of, for example, job position and learning objective identification for the user. The repetition can occur after job positions identification, or after ascertaining learning objectives. This will provide the user with a new recommendation of one or more job positions, learning objectives and/or learning materials.

As mentioned above, the user may be performing job position or learning materials identification in an iterative manner. After the identification of a job position and/or learning objective, the user is not satisfied. To fine-tune, she changes her information, which can be her user profile or preferences, and initiates another identification. In one embodiment, the identifier, in view of changes in the her information, automatically performs another identification. The ascertainer can also re-ascertain her learning objective.

Many of the above embodiments can be used by employers. Just as job positions can be identified for the user, users can be identified for companies with job positions. In other words, many of the above embodiments can be used for recruiting employees.

In one embodiment, in view of the different types of user, the identifier also distinguishes an employer using the system to recruit from a user using the system to get counseling and training. For example, a generic user, who can be an employer or a learner in this case, has an identification. This identification, typically entered into the system during the user's initial use or log in, is stored in the user profile of the generic user. A generic user with a learner identification can use the system for counseling and training, while a generic user with an employer identification can use the system for recruiting, such as accessing users information. In another embodiment, one with an employer identification can also use the system for counseling and training. The identifier, based on the user identification, allows the user access to, and use of, different aspects of the system.

Figure 20:
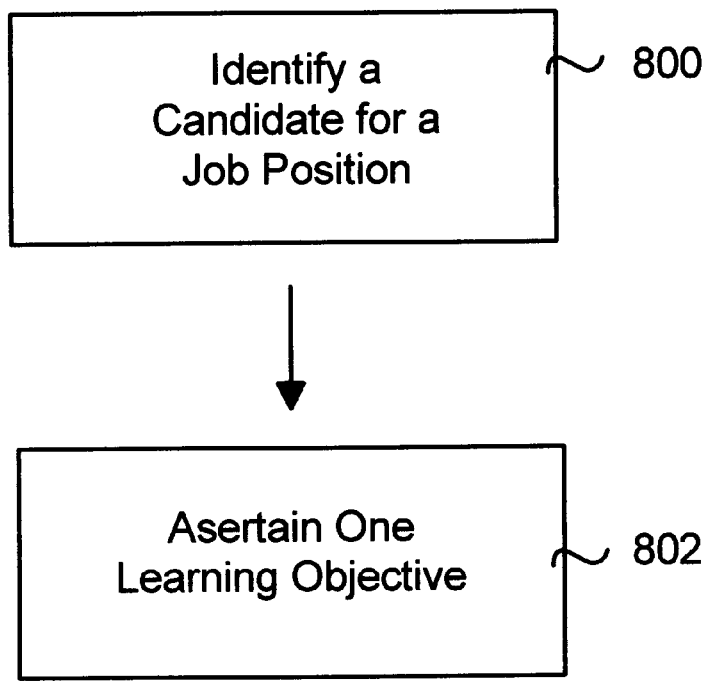
FIGS. 20–21 show embodiments of identifying a candidate for a job position in the present invention.
Figure 21:
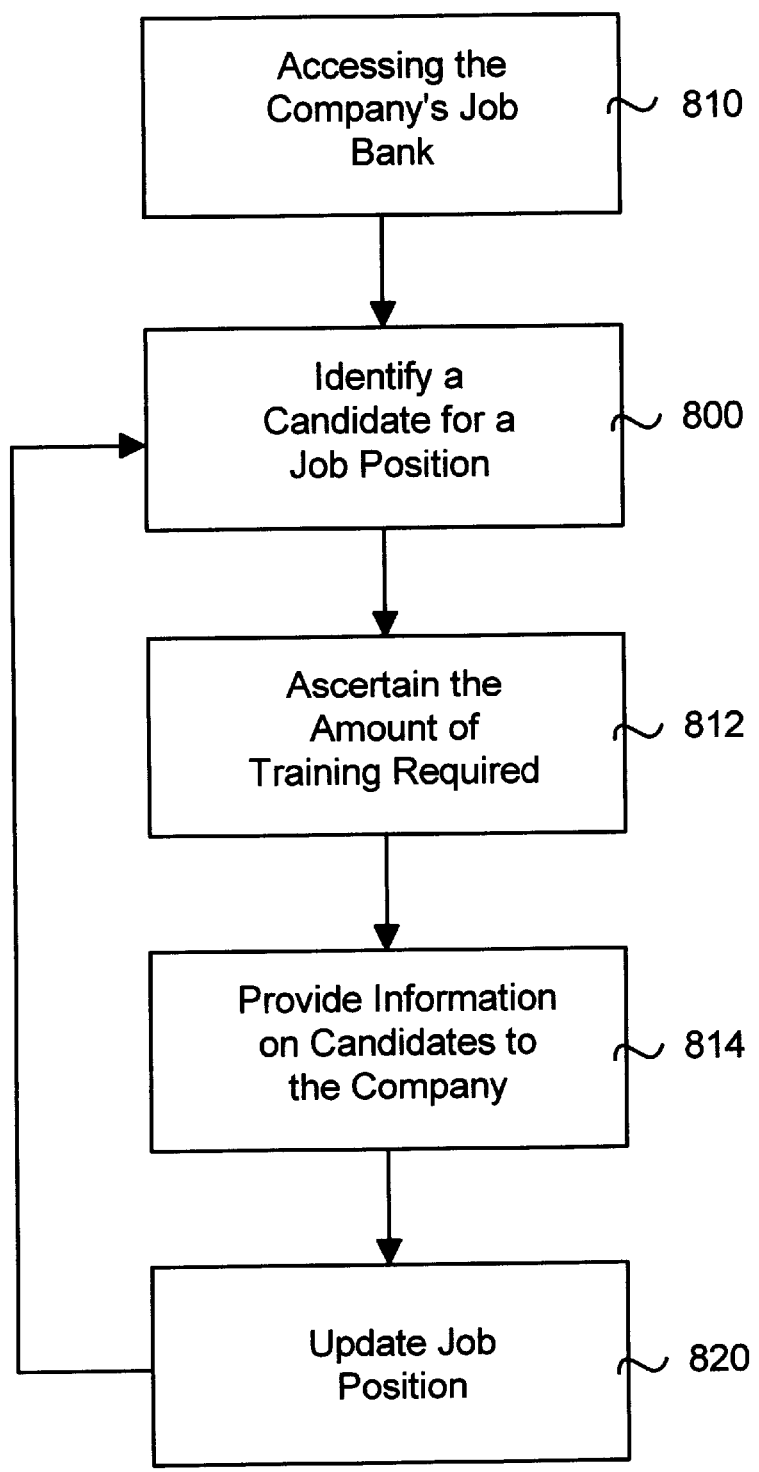

As an example of a company using the system, after the identification of the job position for the user, information on the user can also be provided to the company with the job position. This information can be provided through email or other means. With the user's permission, the information can include the user's name. This will alert the company of the potential candidate for the job position. Similarly, the database in the present invention includes information of many users, who can be potential candidates to job positions. As shown in FIGS. 20 and 21, after a company has a job position available, the identifier can identify (Step 800) a candidate for the job position based on at least one attribute of the candidate's profile. The ascertainer can also ascertain (Step 802) at least one learning objective for the candidate, which provides an indication to the company as to the amount of training required to prepare the candidate for the job position. The ascertainer can also ascertain (Step 812) an indication as to the amount of training required for a typical person with the user's profile, such as her educational background, for the job position. If the company is interested in the candidate, information on the job position can be provided to the candidate.

The process of identifying potential candidates can be done automatically once a company has a job position available. For example, once the company has a job position, attributes on the job position is transmitted to the identifier through a network. Instead of determining job positions for a user based on a number of rules, the identifier identifies a number of potential candidates for the job position, again based on a number of rules. Many of these rules are very similar to the rules previously described. For example, the job position is in Lake Tahoe. The identifier would search its database to identify candidates living around the Lake Tahoe area, and candidates living further away who are willing to relocate. After identifying a number of candidates, the identifier compares them to provide a list for the company. The list can prioritize the candidates based on, for example, the amount of training probably required for each candidate for the job position. Thus, not only does the identifier pre-screen candidates, the identifier can prioritize them.

The process of identifying potential candidates can repeat in view of changes in information on the job position. For example, in view of the recommended candidates, the company decides that there should be at least one more attributes in the potential candidate or one of the attributes in the job position should change. The company can modify or update (Step 820) the attributes of the job position accordingly, and initiates another identification. In one embodiment, the identifier, in view of the modification, automatically performs another identification of potential candidates for the job position. Due to the speed of computer, the company may be performing such identifying of job candidates in an iterative manner by a company representative.

In yet another embodiment, the identifier accesses (Step 810) the company's job bank periodically for new listings. Once there is a new job position available, the identifier automatically identifies potential candidates. These candidates can include the current employees of the company. Information on the candidates is then provided (Step 814) to the company. If the company is interested in a candidate, information on the job position, with the company, is provided to the candidate. In one embodiment, the apparatus, 200, would also help arrange for an interview if the candidate is interested in the job position. For example, the apparatus can provide to the company, the candidate's availability for interview, can buy airline tickets for the candidate and reserve a hotel room for the candidate.

In one embodiment, there is a dictionary matching the data format transmitted by the company and the data format of the candidates information in the database. This helps the identifier identify a number of potential candidates. Such matching processes should be obvious to those skilled in the art, and will not be further described.

As an example of using the invention by a user to identify a job position, the user is an accountant, with a Bachelor of Arts degree. She is working for a defense contractor, but would like to work for a different company. She has a number of preferences, including:

The new position does not require taking more than a one-semester class.

The training materials or classes should be available within one month.

The training facility has to be within twenty miles from where she lives.

She wants a 9-to-5 job, within twenty miles from where she lives.

The job pays at least $30,000 a year.

Based on information in the learning database and/or other resources, the determinator can go through the following analysis:

Job position within 20 miles from the user's residence—→1000 job positions

Annual pay of 90% of them are below $30,000 —→100 job positions left

Of the 100 job positions, 50% requires a BS degree—→50 job positions

Of the 50, 50% requires overtime work regularly—→25 job positions

Of the 25, 80% requires him to take more than a one-semester class—→5 left

Of the 5, training materials of 3 are not available within 1 month—→2 left.

The determinator then allows information to be presented to the user, regarding each of the two available job positions, such as the jobs to be done and the annual salary and benefits. It would be up to the user to pick the learning materials to prepare her for the one or both job positions she wants to move into.

As an example of using the invention to identify a potential candidate, the job position is for a COBOL programmer to tackle the Y2K problem for a company in Canmel, Calif. The company has a number of preferences, including:

1. The candidate has at least a Bachelor degree in computer science.
2. The candidate has at least one year of programming background.
3. The candidate has taken at least one semester of programming in COBOL.
4. The candidate pay will not be more than $45K a year.
5. The candidate has done projects on software debugging for at least one year.
6. The candidate is willing to work overtime regularly.
7. The candidate should be able to start working in one month and does not need more than one month of training on COBOL.

Using information in its database, the determinator can go through the following analysis:

Preference 1 →30,000 candidates
Preference 2 →20,000 candidates left
Preference 3 →4,000 candidates left
Preference 4 →2,000 candidates left
Preference 5 →500 candidates left
Preference 6 →50 candidates left
Preference 7 →The determinator searches for the availability of learning materials on COBOL in one month and identifies some.
→20 candidates left Candidates live within 20 miles of, or willing to relocate to, Carmel—→5 left Upon permission from the candidates, the determinator allows information on the potential candidates to be presented to the company. The determinator may prioritize the candidates based on some rules, such as where the candidates receive their Bachelor degrees from. If the company is interested in one of the candidate, the determinator allows detailed information on the job positions, such as the jobs to be done and the annual salary and benefits, to be presented to the candidates.

As explained above, the materials presenter can be in a computer different from the determinator, with the two computers connected by a network. As further explained above, the network can be the Internet, an intranet, the Web or other forms of networks. Thus, the network can be a private network, such as an intranet; or a public network, such as the Internet. The network can include both the private and public network.

Other embodiments of the invention will be apparent to those skilled in the art from a consideration of this specification or practice of the invention disclosed herein. It is intended that the specification and examples be considered as exemplary only, with the true scope and spirit of the invention being indicated by the following claims.

What is claimed is:

1. A computer-aided learning method comprising the steps of:
   identifying, by a first computer, a job position for a user, based on at least one retrieved attribute of the user's profile;
   ascertaining, by the first computer, at least one learning objective for an identified job position to select learning materials to prepare the user for the job position;
   updating, by the first computer, information on the user due to changes in information on the user from an input; and
   repeating, by the first computer, the step of identifying in view of the update;
   wherein the first computer can also identify the one or more jobs needed to be done for the job position.

2. A computer-aided learning method as recited in claim 1 wherein the at least one attribute of the user's profile is the user's work experience.

3. A computer-aided learning method as recited in claim 1 wherein the at least one attribute of the user's profile is the user's learning history.

4. A computer-aided learning method as recited in claim 1 wherein the at least one attribute of the user's profile is the user's job interview.

5. A computer-aided learning method as recited in claim 1 wherein the step of identifying depends on the availability of job positions.

6. A computer-aided learning method as recited in claim 1 wherein the step of identifying depends on at least one characteristic of the user's preference.

7. A computer-aided learning method as recited in claim 1 wherein the step of identifying depends on the availability of the learning materials.

8. A computer-aided learning method as recited in claim 1 wherein the step of identifying further comprises the step of optimizing a number of factors, including at least one attribute of the user's profile, the job positions available, at least one characteristic of the user's preference, and the availability of learning materials.

9. A computer-aided learning method as recited in claim 1 wherein the step of ascertaining the at least one learning objective depends on the job position identified and at least one attribute of the user's profile.

10. A computer-aided learning method as recited in claim 9 wherein the step of ascertaining the at least one learning objective depends on at least one characteristic of the user's learning history and at least one characteristic of the user's work experience.

11. A computer-aided learning method as recited in claim 1 further comprising the step of selecting for the user learning materials based on the at least one learning objective.

12. A computer-aided learning method as recited in claim 1 wherein the changes are from the response of an inquiry sent to the user.

13. A computer-aided learning method as recited in claim 12 wherein the inquiry is sent to the user periodically so as to keep information on the user current.

14. A computer-aided learning method as recited in claim 1 wherein the changes are provided by the user at the user's initiative.

15. A computer-aided learning method as recited in claim 1 wherein the learning materials are presented to the user through a second computer, which is connected to the first computer by a network.

16. A computer-aided learning method as recited in claim 15 wherein the network includes a private network.

17. A computer-aided leaning method as recited in claim 15 wherein the network includes a public network.

18. A computer-aided learning method as recited in claim 17 wherein the network includes a private network.

19. A computer-aided learning method as recited in claim 1 further comprising the steps of:
   identifying, by the first computer, a candidate for a company's job position, based on at least one retrieved attribute of the candidate's profile;
   ascertaining, by the first computer, at least one learning objective for an identified candidate to select learning materials to prepare the candidate for the job position;
   wherein the at least one learning objective for the candidate provides an indication to the company the amount of training required to prepare the candidate for the job position.

20. A computer-aided learning method comprising the steps of:
   identifying, by a first computer, a job position for a user, based on at least one retrieved attribute of the user's profile;
   updating, by the first computer, information on the user due to changes in information on the user; and
   repeating, by the first computer, the step of identifying in view of the update;
   wherein the changes are from the response of an inquiry sent to the user; and the inquiry is sent to the user periodically so as to keep information on the user current and to help the user learn at least one learning objective for an identified job position.

21. A computer-aided learning method comprising the steps of:
   identifying, by a first computer, a job position for a user, and the one or more jobs needed to be done for the job position, with the step of identifying including the step of optimizing a number of factors, including at least one retrieved attribute of the user's profile, the job positions available, and at least one characteristic of the user's preference; and
   ascertaining, by the first computer, at least one learning objective for an identified job position to select learning materials to prepare the user for the job position;
   wherein the optimizing factors also include the availability of the learning materials; and the learning materials are presented to the user through a second computer, which is connected to the first computer by a network.

22. A computer-aided learning method comprising the steps of:
   identifying, by a first computer, a candidate for a company's job position, based on at least one retrieved attribute of the candidate's profile;
   ascertaining, by the first computer, at least one learning objective for an identified candidate to select learning materials to prepare the candidate for the job position;
   updating, by the first computer, information on the job position due to changes in information on the job position from an input; and
   repeating, by the first computer, the step of identifying in view of the update;
   wherein the at least one learning objective for the candidate provides an indication to the company the amount of training required to prepare the candidate for the job position.

23. A computer-aided learning method comprising the steps of:
   identifying, by a first computer, at least one candidate for a company's job position, based on at least one retrieved attribute of each candidate's profile;
   ascertaining, by the first computer, an indication as to the amount of training required to prepare the at least one candidate for the job position;
   accessing the company's database by the first company to obtain information of the job position;
   providing information on the identified candidates to the company, including the indication on the amount of training required for each candidate; and
   providing information on the job position to a candidate if the company is interested in the candidate;
   wherein the information of the job position is from the company's database on job positions and to help the user learning at least one learning objective for the identified job position.

24. A computer-aided learning apparatus comprising:
   an identifier in a computer, configured to
      identify a job position for a user, based on at least one retrieved attribute of the user's profile; and
      update information on the user due to changes in information on the user so as to identify a job position for the user; and
   an ascertainer in the computer, configured to ascertain at least one learning objective for an identified job position to select learning materials to prepare the user for the job position;
   wherein the identifier can also identify the one or more jobs needed to be done for the job position.

25. A computer-aided learning apparatus as recited in claim 24 wherein one attribute of the user's profile is the user's work experience.

26. A computer-aided learning apparatus as recited in claim 25 wherein the user's work experience includes the subject area of, and the duration the user being involved in, the most recent project the user worked on.

27. A computer-aided learning apparatus as recited in claim 24 wherein one attribute of the user's profile is the user's learning history.

28. A computer-aided learning apparatus as recited in claim 24 wherein one attribute of the user's profile is the results of one of the user's job interviews.

29. A computer-aided learning apparatus as recited in claim 24 wherein the identifier identifies based on the availability of job positions.

30. A computer-aided learning apparatus as recited in claim 24 wherein the identifier identifies based on at least one characteristic of the user's preference.

31. A computer-aided learning apparatus as recited in claim 24 wherein the identifier identifies based on the availability of the learning materials.

32. A computer-aided learning apparatus as recited in claim 24 wherein the identifier identifies through optimizing a number of factors, including least one attribute of the user's profile, the job positions available, at least one characteristic of the user's preference, and the availability of learning materials.

33. A computer-aided learning apparatus as recited in claim 24 wherein the ascertainer ascertains the at least one learning objective based on the job position identified and at least one attribute of the user's profile.

34. A computer-aided learning apparatus as recited in claim 33 wherein the ascertainer ascertains the at least one learning objective based on at least one characteristic of the user's learning history and at least one characteristic of the user's work experience.

35. A computer-aided learning apparatus as recited in claim 24 wherein the ascertainer is further configured to select for the user learning materials based on the at least one learning objective.

36. A computer-aided learning apparatus as recited in claim 24 wherein the changes are from the response of an inquiry sent to the user.

37. A computer-aided learning apparatus as recited in claim 36 wherein the inquiry is sent to the user periodically so as to keep information on the user current.

38. A computer-aided learning apparatus as recited in claim 24 wherein the changes are provided by the user at the user's initiative.

39. A computer-aided learning apparatus as recited in claim 24 wherein:
   the identifier is in a first computer; and
   the learning materials are presented to the user through a second computer, which is connected to the first computer by a network.

40. A computer-aided learning apparatus as recited in claim 39 wherein the network includes a private network.

41. A computer-aided learning apparatus as recited in claim 39 wherein the network includes a public network.

42. A computer-aided learning apparatus as recited in claim 41 wherein the network includes a private network.

43. A computer-aided learning apparatus as recited in claim 24 wherein:
   the identifier is further configured to identify a candidate for a company's job position, based on at least one attribute of the candidate's profile, and the ascertainer is further configured to ascertain at least one learning objective to select learning materials to prepare the candidate for the job position;

wherein the at least one learning objective for the candidate provides an indication to the company the amount of training required to prepare the candidate for the job position.

44. A computer-aided learning apparatus comprising:

an identifier in a computer, configured to
identify a job position for a user, based on at least one retrieved attribute of the user's profile; and
update information on the user due to changes in information on the user for the identifier to identify a job position for the user again;

wherein the changes are from the response of an inquiry sent to the user; and the inquiry is sent to the user periodically so as to keep information on the user current and to help the user learn at least one learning objective for an identified job position.

45. A computer-aided learning method comprising:

an identifier in a first computer, the identifier configured to identify a job position for a user, and the one or more jobs needed to be done for the job position, with the process of identifying including the process of optimizing a number of factors including at least one retrieved attribute of the user's profile, the job positions available, and at least one characteristic of the user's preference; and an ascertainer in the first computer, configured to ascertain at least one learning objective for an identified job position to select learning materials to prepare the user for the job position;

wherein the optimizing factors also include the availability of the learning materials; and the learning materials are presented to the user through a second computer, which is connected to the first computer by a network.

46. A computer-aided learning method comprising:

an identifier in a first computer, configured to
identify a candidate for a company's job position, based on at least one retrieved attribute of the candidate's profile; and
update information on the job position due to changes in information on the job position to identify a candidate for the job position; and an ascertainer in the first computer, configured to ascertain at least one learning objective for an identified candidate to select learning materials to prepare the candidate for the job position;

wherein the at least one learning objective for the candidate provides an indication to the company the amount of training required to prepare the candidate for the job position.

47. A computer-aided learning method comprising:

an identifier in a first computer, configured to identify at least one candidate for a company's job position, based on at least one retrieved attribute of each candidate's profile; and an ascertainer in the first computer, configured to ascertain an indication as to the amount of training required to prepare the at least one candidate for the job position;

wherein the information of the job position is from the company's database on job positions, and to help the user learn at least one learning objective for an identified job position; the company database is accessed to obtain information of the job position; information on the identified candidates is provided to the company, including the indication on the amount of training required for each candidate; and information on the job position is provided to a candidate if the company is interested in the candidate.

* * * * *

UNITED STATES PATENT AND TRADEMARK OFFICE
CERTIFICATE OF CORRECTION

PATENT NO.   : 6,213,780 B1
DATED        : April 10, 2001
INVENTOR(S)  : Ho et al.

It is certified that error appears in the above-identified patent and that said Letters Patent is hereby corrected as shown below:

Column 21,
Line 43, change "the first company" to -- the first computer --.
Line 53, change "user learning" to -- user learn --.

Column 23,
Line 21, change "method" to -- apparatus --.
Line 27, change "one retrieved attribute" to -- one attribute --.

Column 24,
Line 1, change "method" to -- apparatus --.
Line 18, change "method" to -- apparatus --.

Signed and Sealed this

Tenth Day of December, 2002

JAMES E. ROGAN
*Director of the United States Patent and Trademark Office*